United States Patent [19]
Zeytoonjian et al.

[11] Patent Number: 5,610,586
[45] Date of Patent: *Mar. 11, 1997

[54] GOLF CART CONTROL AND MONITORING APPARATUS AND SYSTEM

[75] Inventors: Douglas Zeytoonjian, Boston, Mass.; Frederick Zeytoonjian, Sr., Somers, Conn.; Harold Kramer, Pittsfield; Paul Allen, North Adams, both of Mass.

[73] Assignee: Cart Watch, Inc., Enfield, Conn.

[ * ] Notice: The term of this patent shall not extend beyond the expiration date of Pat. No. 5,438,319.

[21] Appl. No.: 391,416

[22] Filed: Feb. 16, 1995

Related U.S. Application Data

[63] Continuation-in-part of Ser. No. 82,030, Jun. 24, 1993, Pat. No. 5,438,319.

[51] Int. Cl.$^6$ .................................................. G08B 13/14
[52] U.S. Cl. ...................... 340/571; 340/332; 340/691; 340/988
[58] Field of Search ...................... 340/571, 573, 340/691, 988, 993, 323 R, 326, 332, 309.15, 328, 329, 384.7; 377/5, 9, 17; 455/67.7, 55.1; 307/64, 66; 343/719; 280/33.994, DIG. 5

[56] References Cited

U.S. PATENT DOCUMENTS

| | | | |
|---|---|---|---|
| 3,934,175 | 1/1976 | Clark | 361/56 |
| 4,480,310 | 10/1986 | Alvarez | 364/450 |
| 4,655,476 | 4/1987 | Tavtigian | 340/993 |
| 4,703,444 | 10/1987 | Storms et al. | 364/561 |
| 4,766,847 | 8/1988 | Venczel et al. | 119/29 |
| 4,792,804 | 12/1988 | Rubechini | 340/561 |
| 4,926,161 | 5/1990 | Cupp | 340/572 |
| 4,996,945 | 3/1991 | Dix, Jr. | 119/29 |
| 5,044,635 | 9/1991 | Dudley | 340/323 R |
| 5,053,768 | 10/1991 | Dix, Jr. | 340/988 |
| 5,097,416 | 3/1992 | Matthews | 340/323 R |
| 5,305,201 | 4/1994 | Matthews | 340/993 X |
| 5,326,095 | 7/1994 | Dudley | 340/323 R X |
| 5,438,319 | 8/1995 | Zeytoonjian et al. | 340/571 |

*Primary Examiner*—Thomas Mullen
*Attorney, Agent, or Firm*—Lorusso & Loud

[57] ABSTRACT

A golf cart control and monitoring apparatus, includes a signal transmitter, at least one antenna, a signal receiving and processing device, and an event log device. The signal transmitter transmits a plurality of electromagnetic signals, each signal being representative of a position with respect to a restricted area of a golf course. The signal receiving and processing device receives the electromagnetic signals radiating from the antenna and provides output signals representative of the location of the cart with respect to the restricted area, where at least one of these output signals is representative of the golf cart being located in the restricted area. The event log device is responsive to the signal receiving and processing device and generates historical log of how long and how many times the golf cart was located within golf course restricted areas. In another embodiment, a plurality of ranging signals are transmitted from a number of antennas located at known location on the golf course and the signals receiving and processing device includes a microprocessor for determining the location of the cart with respect to the restricted area based on these ranging signals.

127 Claims, 12 Drawing Sheets

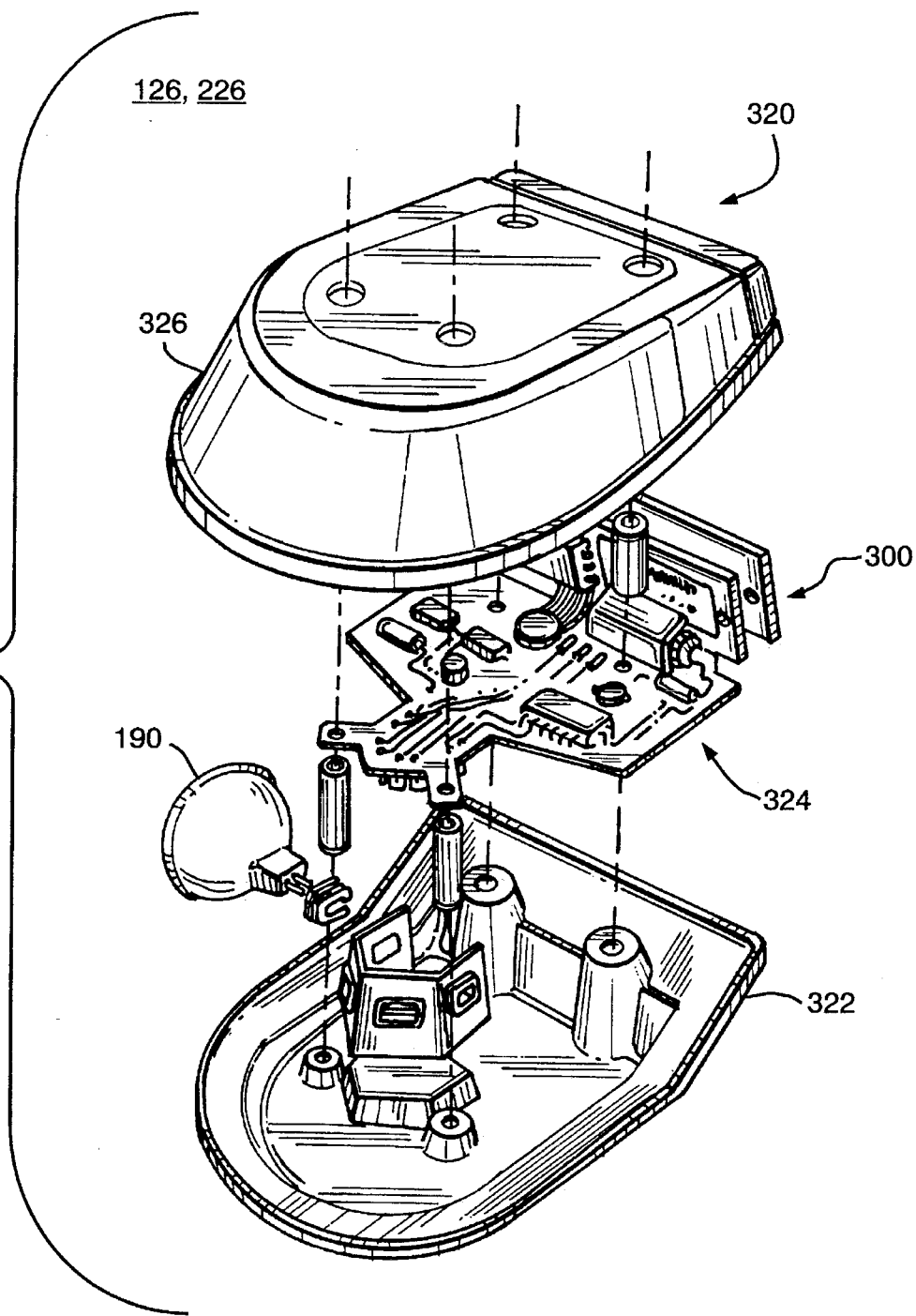

GOLF CART CONTROL AND MONITORING APPARATUS AND SYSTEM

This application is a continuation in part of application Ser. No. 08/082,030, filed Jun. 24, 1993, now U.S. Pat. No. 5,483,319, issued Aug. 1, 1995, the teachings of which are incorporated herein by reference.

FIELD OF INVENTION

This invention relates to a control and monitoring apparatus for golf carts and more particularly to an apparatus which monitors the movement of a golf cart with respect to golf course restricted or protected areas, which provides an event history of golf cart movement with respect to at least a portion of such areas, and which provides visual and/or auditory alerts and alarms so a golf cart operator can avoid such areas.

BACKGROUND OF THE INVENTION

Maintenance of golf courses involves a significant amount of time and expense. This time and cost for maintenance is impacted when golf carts are driven onto areas of the golf course (e.g. the greens) where the traveling golf carts can cause damage. In addition to the cost and time associated with fixing the damaged grounds, the damage areas can inconvenience golfers, affect play, and in general make a golfer's use of the course less enjoyable.

There are two methods available for controlling the movement of golf carts while they are being operated on golf courses. One method involves providing some sort of warning to identify restricted areas of the golf course so the golf cart operator can avoid them. In the second method a predetermined course of action is dictated to the cart operator in the event the operator does not heed the warnings identifying restricted areas.

Under the first method golf courses have provided signs to identify restricted areas and to identify the paths on which the golf carts are supposed to travel. Alternatively, visual and auditory alarms have been provided on the golf carts to identify restricted areas and to indicate when the carts have intruded into the restricted area. Unfortunately, these schemes are not as effective as one would like.

The alternate scheme, disclosed in U.S. Pat. No. 4,656,476, uses an antenna/transmitter combination to identify the boundaries of the restricted areas; uses a receiver and signal processor to receive the transmitted signals and generate an output signal when the signal strength has exceeded a threshold; and provides visual/auditory alarms, responsive to the output signals, for the operators to determine where to drive the golf carts. Three visual alarms are used to indicate that the golf cart is approaching the outer boundary of a restricted area, to indicate that the cart is approaching a restricted area, and to indicate that the cart has entered a restricted area. An auditory alarm can be used to supplement the visual warnings.

This scheme, however, is only effective to protect restricted areas if the operator is willing to follow the visual and auditory queues. There is no provision made to hold operators accountable for their actions or lack thereof. Nor is there any provision made so golf course rangers patrolling the course can identify golf carts which are improperly parked or traveling on the golf course.

The second method of controlling assumes that some operators will not respond, for one reason or another, to the visual and/or auditory alarms. As such, this method dictates a predetermined course of action to be taken by a cart operator in the event the operator does not exit or avoid restricted areas per the warnings. The apparatus includes provisions to ensure that the operator follows the predetermined course of action.

The golf cart control system, disclosed in U.S. Pat. No. 5,053,768, provides both alarms to induce operator action and means for enforcing a predetermined course of action if the golf cart is not removed from a restricted area within a predetermined period of time. This system identifies the boundary of the restricted area by means of an single antenna and transmitter. When a signal above a predetermined threshold is received, the cart control system receiver package located on the golf cart, provides a visual warning (e.g., a single colored light) that the cart is entering a restricted area. This signal also starts a timer used to generate a second visual alarm if the golf cart has not exited the restricted area within a preset time.

If the operator fails to exit the restricted area within the preset time, the system has provisions for disabling the golf cart so it cannot be driven further in the forward direction in the protected area. Rather the golf cart is disabled so that it can only be driven in reverse or "backed out" of a restricted area. Disablement is accomplished by interconnecting the golf cart's drive with the cart control system. Disabling of the cart along with prespecifying the cart's direction of travel has certain short comings.

Since golf courses are not known for being flat, especially around the greens, it is quite possible for the cart to be going down an inclined section when the power is cut off. If the operator is not paying attention or is unaware that they have entered a restricted area (e.g., the alarm light has burned out), it is possible for the operator to become unnecessarily surprised or even injured (e.g., bump head) when the power is cut off and the vehicle comes to a sudden stop. Also when the cart is being backed out, the cart's operation could damage the turf or grass on the inclined section if it is wet.

This system contains no features for identifying non-conforming operators to golf course representatives (e.g., course rangers) during or after a game (i.e., no means for holding operators accountable for their actions). Rather, as indicated above, after receipt of the initial signal the cart is disabled upon the expiration of a predetermined amount of time. Thus, there is no way of determining if a cart operator ever violated the course rules concerning restricted areas during the time of play.

If an operator is not familiar with the disabling function or does not believe a restricted area had been entered, the operator may incorrectly conclude that the cart has had a power or transmission failure. The delay in resolving the reason for the golf cart's failure can impact or delay the play of other golfers, as well as annoy the operator. The operator could also become annoyed because the cart has become disabled and the operator is being forced to back-up the golf cart. Since golf like many games is part mental attitude, a golfer is quite likely to blame a bad hole or bad game on the problems with the cart. While protecting restricted areas is important, annoying golfers or interfering with the game of other golfers is not necessarily in the best interests of the golf course.

As a practical matter, the predetermined time period is on the order of about 2 seconds to assure that a golf cart does not make a large incursion into a restricted area (i.e., a golf cart traveling at 10 mph will traverse about 30 feet or 10 yards in 2 seconds). Because of the restrictive turn radius of golf carts, it is quite likely that the predetermined time period will expire before the cart can be turned around to exit the area. Thus, operators who turn their cart around and are exiting in compliance with the first warning will be forced to back-up out of the restricted area. This would happen even if driving forward would be the fastest and best way to exit. The likelihood of the time expiring before exiting becomes greater for operators who are moving at speeds slower than that assumed for determining the preset time period.

Disabling the cart also involves interfacing and interconnecting the cart control system with the controls and drive system for the golf cart. This increases the complexity of the cart control system and creates another failure mode for the cart. Since it is a common practice for golf courses to rent their golf carts, it is quite possible that such modifications to disable a cart would not be allowed by the cart owner; could only be done by the cart owner at the golf course's expense; or could involve additional charges from the owner to return the cart back to its as rented condition (e.g., repair cart). These added costs will likely exceed the typical rental charges, especially for daily rentals. Alternatively the golf course would have to purchase carts in lieu of renting them.

Rental carts are a concern because they are usually obtained when a golf course is anticipating a large number of guests for special events such as tournaments. Damage to restricted areas is more likely to occur at these times because the guests are not familiar with course rules and the areas of the course to be avoided. As such, rental cart usage and the potential for damage must be addressed.

Other systems involving golf cart control or locating a golf cart with respect to some feature of the golf course are disclosed in U.S. Pat. Nos. 4,480,310 and 4,926,161.

Another course management concern that can effect play and cause golfer inconvenience is when golfers take a longer amount of time to play a game of golf than expected. This is often referred to as slow play. Typically tee off or start times for golfers are staggered so the golfers that tee off earlier have sufficient time to advance their play so that they should not interfere with the game of the later starting golfers. However, golfers who are playing slow delay the game of the later starting golfers or the slow playing golfers have to stop their play long enough so the later started golfers can play through. Alternatively, course management could increase the delay between the start times, however, this affects the number of golfers who can use the course and the fees for golfing. Present techniques for dealing with slow play, involves manual tracking of the playtime and/or providing a golfer with a mechanism that the golfer operates to keep track of the time. Both techniques require the active and continuous involvement of course representatives as well as the golfers.

There is a need, therefore, for a technique or mechanism that automatically keeps track of a golfer's time of play without requiring the golfer's participation in the data collection process. Such a technique or mechanism should also provide this information to the golfer and/or course representative. More particularly, the timing process should be automatically initiated and reflect how golf is played at a given course.

Therefore, it is an object of the present invention to provide a golf cart control and monitoring apparatus that monitors golf cart usage so cart operators who intrude into restricted/protected areas of a golf course can be identified and so these operators can be held accountable for their actions after and/or during a game.

It is a further object of the present invention to provide an apparatus that does not involve controlling the operation of a golf cart to prevent intrusion or further intrusion into a restricted area (e.g., disabling the cart).

Another object of the present invention is to provide an apparatus that makes decisions based on cart location with respect to the restricted area.

It is yet a further object of the present invention to provide an apparatus that provides both visual and auditory alarms/signals to a golf cart operator to identify restricted areas so the operator will not intrude into these areas.

It is yet another object of the present invention to provide an apparatus that permits course personnel to readily identify golf carts that are located in restricted areas.

It is still yet another object of the present invention to provide an system which uses RF signal triangulation techniques for determining the location of the golf cart with respect to protected areas.

It is still yet a further object of the present invention to provide a system and apparatus that automatically determines and keeps track of the play time for each game and to make this information available to the cart operator/golfer as well as course representatives.

SUMMARY OF THE INVENTION

This invention features a golf cart control and monitoring apparatus/system that monitors golf cart usage with respect to golf course restricted areas. The apparatus provides visual and auditory alarms to cart operators advising them of restricted areas so that the operators can avoid these areas. The apparatus also includes provisions so that cart operators who intrude into restricted/protected areas of a golf course can be identified and so these operators can be held accountable for their actions after and/or during a game. The instant invention can be practiced using three different antenna configurations; at least one antenna disposed about the boundary of a restricted area and preferably below grade, at least two antennas disposed about the boundary of a restricted area and preferably below grade, and a plurality of above ground antennas spaced from each other and being disposed about and beyond the restricted area boundary that radiate ranging signals and more particularly define a set of ranging signals.

The golf cart control and monitoring apparatus of one embodiment of the instant invention includes a signal transmission means having at least one antenna, a signal receiving and processing means, and an event log means. The signal transmission means transmits a plurality of electromagnetic signals, each signal being representative of a position with respect to a restricted area of a golf course. Preferably, the signal transmission means includes an antenna disposed about the restricted area of the golf course and being below grade.

The signal receiving and processing means receives and process the electromagnetic signals radiating from the at least one antenna and provides output signals representative of the location of the cart with respect to the restricted area. At least one of these output signals is representative of the golf cart being located in the restricted area.

The event log device is responsive to the signal receiving and processing device and generates a log of how long and/or how many times the golf cart was located within golf course restricted areas. In alternate embodiments, the event log means includes an event counter that counts each time the cart is considered to have entered into the restricted area and a time accumulation means for determining the amount of time the cart is considered to be in the restricted area, as well as means for displaying the number of restricted area entries and the amount of time the cart was in restricted areas.

Preferably the signal receiving and processing means includes determining means for determining when the golf cart is approaching the restricted area (i.e., cart in a warning area) and when the cart is considered located in a restricted area. The signal receiving and processing means outputs a first output signal when the cart is determined to be in the warning area and a second output signal when the cart is considered to be located in the restricted area. More particularly, the signal transmission means generates a plurality of repetitive signal pulses and the signal receiving and processing means includes means for determining based on these signals pulses when the cart is in the warning area and when the cart is considered located in the restricted area.

The determining means preferably includes pulse counting means that counts the number of signal pulses being received and second signal output means that outputs a second output signal indicating that the cart is in a restricted area after a prespecified number of pulses have been counted. If the prespecified number is reached, the cart is considered to be in a restricted area. Alternatively, the determining means may include clock means for determining the amount of time that has elapsed since electromagnetic signals from the antenna have been received. In the alternate embodiment, a second signal is outputted if the prespecified amount of time has elapsed.

The control and monitoring apparatus may include an external visual warning means, visual alarm means, auditory alarm means, message display means solar electrical power supply means and/or a lightning protection device that protects the antenna and signal transmission means from lightning strikes. The visual warning means generates a visual signal to course representatives identifying golf carts that are considered located in restricted areas. The visual and auditory alarms provide visual and auditory alarm to the cart operator to indicate that the cart is approaching a restricted area or that the cart is considered in the restricted area. The message display means, displays at least one pre-scripted message to inform the cart operator of the cart's location with respect to restricted areas. In particular, a message is displayed that the cart is approaching the restricted area or that the cart is in a restricted area.

In another embodiment of the instant invention, a system for controlling and monitoring includes a device for controlling and monitoring the operation of the golf cart and a set of at least three remote transmitters. The set of at least three remote transmitters are located at known locations about the golf course to define a triangle encompassing a substantial portion of the golf course, including golf course restricted areas. Each of the transmitters transmits a repetitive ranging signal and the combined ranging signals from the set of transmitters defines sets of ranging signals.

The controlling and monitoring device is disposed on the golf cart and includes a receiving means, a signal processing and control means and an event log means. The receiving means receives the sets of ranging signals and the signal processing and control means processes each set of ranging signals to determine the location of the golf cart with respect to a predetermined feature of the golf course. The processing and control means provides or outputs control signals, each control signal being representative of the cart's location with respect to a predetermined feature, where at least one of the control signals outputted is representative of the cart being located in a restricted area.

The event log means of this embodiment, is responsive to control signals that represent the cart's location with respect to restricted areas. The event log means generates a log of how long and how many entries a cart has been located in restricted areas. The controlling and monitoring device may also include means for identifying the specific area intruded into and for how long the cart was located in each area intruded. The other features of an event log means of the first embodiment (e.g., event counter) also are also found in the event log means of this embodiment.

Preferably, the signal processing and control means includes a signal processing means for processing the received sets of ranging signals, a memory for storing at least data indicating the location of each predetermined feature of the golf course, means for accessing the memory, determining means for processing locational information and control signal providing means for providing or outputting control signals responsive to said determining means. The signal processing means processes each set of ranging signals to determine the cart's location on the course and the memory is accessed to retrieve stored information regarding the location of predetermined course features (e.g., restricted areas).

The determining means compares or processes the locational information for course features, that is retrieved from the memory, with the determined location of the cart and, based on this information, determines the location of the cart with respect to the predetermined feature. For example, a determination is made to see if the cart's determined location corresponds to the location for a given restricted area. When the cart is determined to be located in a restricted area, the control signal providing means outputs or provides the control signal representative of the cart being in a restricted area. The control signal providing means also outputs another control signal when it is determined that the cart is in a warning area.

The control and monitoring system includes an external visual warning means, visual alarm means, auditory alarm means, message display means, solar electrical power supply means and/or a lightning protection device that protects each remote transmitter from lightning strikes. The visual warning means generates a visual signal to course representatives identifying golf carts that are located in restricted areas. The visual and auditory alarms provide visual and auditory alarms to the cart operator to indicate that the cart is approaching a restricted area (i.e., is located in a warning area) or that the cart is in the restricted area. The message display means, provides at least one pre-scripted message to inform the cart operator of the cart's location with respect to restricted areas. In particular, a message is displayed indicating that the cart is in the warning area or a message that the cart is in a restricted area.

BRIEF DESCRIPTION OF THE DRAWING

FIG. 5 is an exploded axonometric view of the electromagnetic signal receiving, processing and display means and it associated housing.

DESCRIPTION OF THE PREFERRED EMBODIMENT

Figure 1A:
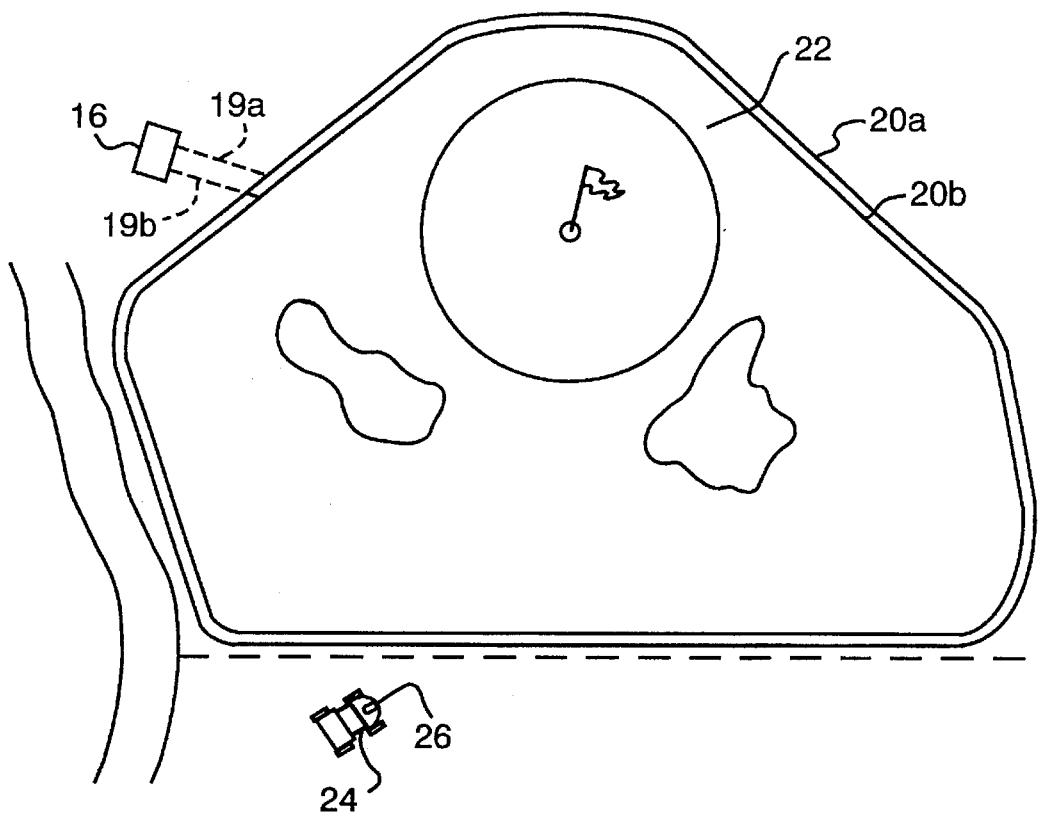
FIG. 1A is a plan view of a restricted golf course area where two antennas encompass the restricted area.

There are a number of areas around a golf course designated by course representatives (e.g., the course supervisor) where golf carts are excluded because a traveling cart can damage these areas. These areas include tees, low lying wet areas, designated practice areas, the putting greens, and the areas contiguous to the putting greens. There is shown in FIGS. 1A,C,E plan views of a restricted area 22,122,222 about a green on a golf course. This restricted area 22,122, 222 includes the sand traps fronting the green, the green and the part of the fairway contiguous to the green.

In FIG. 1A, two antennas 20a,b are disposed about the boundary of the restricted area 22 and are preferably disposed below grade so that they do not interfere with golf play or maintenance activities such as the cutting of grass. In this way, a golf cart 24 cannot approach the restricted area 22 without the signal receiving, processing and display means 26, located on the golf cart 24, from first receiving an electromagnetic signal radiating from the outer antenna 20a. Similarly, the golf cart cannot enter into the restricted area, which is bounded by the inner antenna 20b, without next receiving an electromagnetic signal from the inner antenna.

Figure 1B:
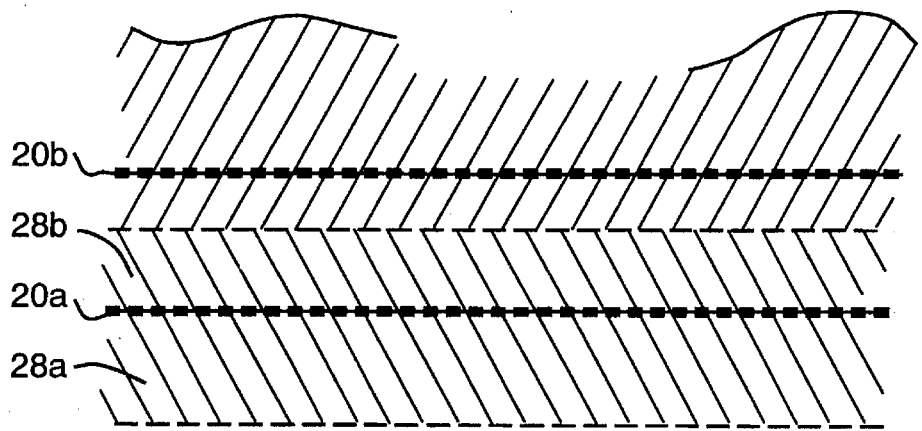
FIG. 1B is a plan view of a portion of the restricted area boundary of FIG. 1A.

As shown in FIG. 1B, the outer and inner antennas 20a,b are spaced from each other to establish two alert zones 28a,b. The first alert zone 28a extends outward from the second alert zone 28b and covers the area about the restricted area 22 where a cart operator is to be given a warning that the cart is approaching a restricted area. The second alert zone 28b covers both the restricted area 22 and the area between the inner antenna 20b and the inner boundary of the first alert zone 28a. The second alert zone 28b is the zone in which a cart operator is to receive a warning that the cart is in a restricted area and in which information, wanted by the golf course representatives concerning intrusions into the second alert zone (i.e., the restricted area) by a golf cart, is begun to be accumulated. In sum, the two alert zones 28a,b provide a basis for establishing different visual and auditory queues for the cart operator, as well as establishing the different monitoring criteria for the golf carts.

FIGS. 1A, 1B are more fully discussed in the related U.S. application Ser. No. 08/082,030. Reference should also be made to the related U.S. Application (e.g., discussion concerning FIGS. 2,3 thereof) for details regarding the antennas 20a,b, the transmitter means 16, the lines 19a,b and the signal receiving, processing and display means 26.

Figure 1C:
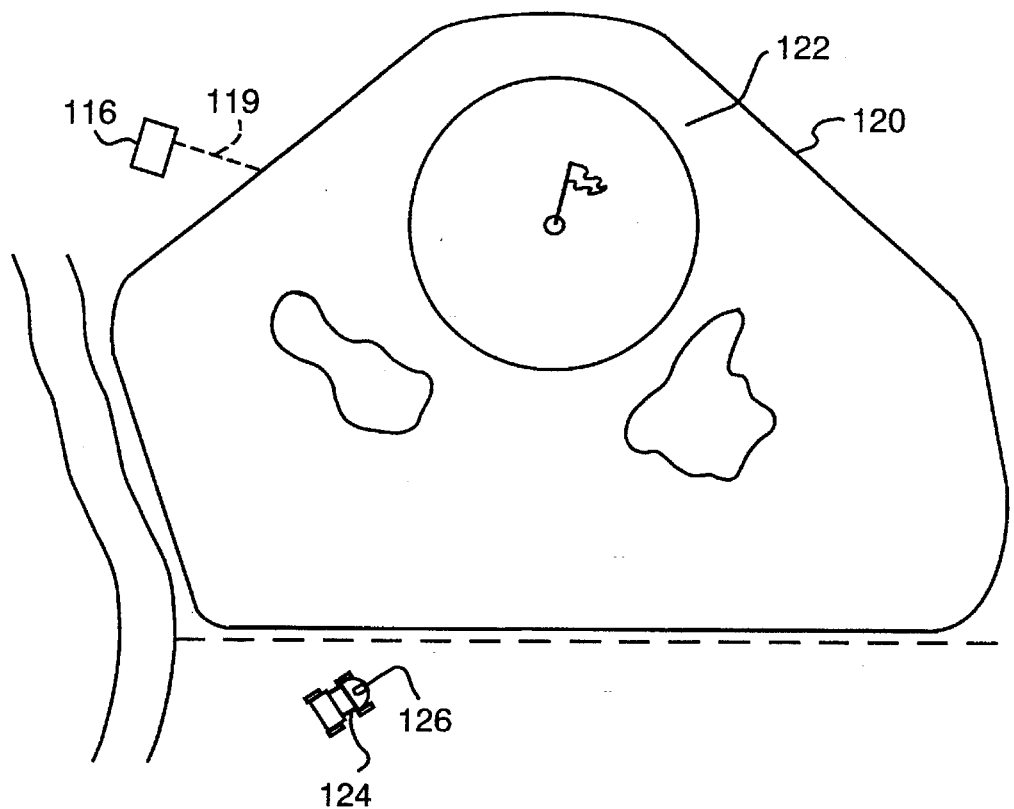
FIG. 1C is a plan view of a restricted golf course area where one antenna encompasses the restricted area.

In another embodiment, as shown in FIG. 1C, a single antenna 120 is disposed about the boundary of the restricted area 122 and is preferably disposed below grade so that it does not interfere with golf play or maintenance activities such as the cutting of grass. In this way, a golf cart 124 cannot approach the restricted area 122 without the signal receiving, processing and display means 126 receiving an electromagnetic signal radiating from the antenna 120. As explained hereinafter concerning FIG. 2A, if the golf cart continues to travel in or about the restricted area a second signal is generated indicating that the cart is located in a restricted area. As with the dual antenna configuration of FIG. 1A, B, this in effect establishes two areas, a warning area about the restricted area and the restricted area.

Figure 1D:
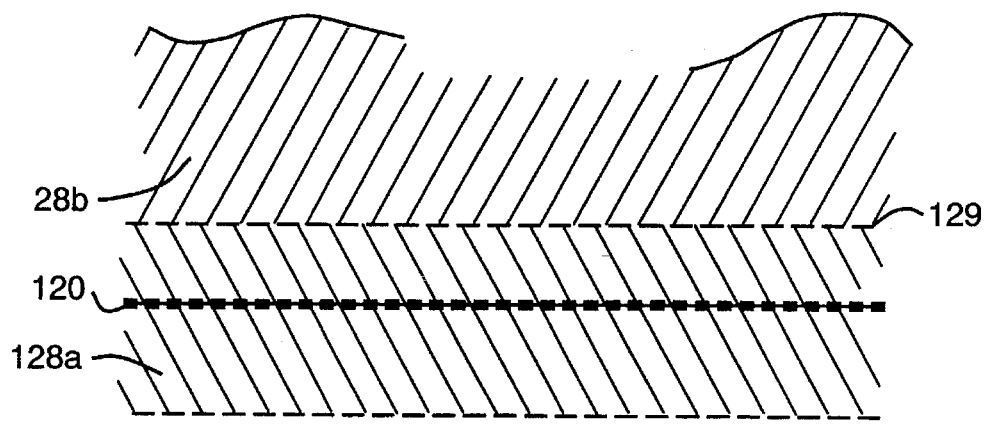
FIG. 1D is a plan view of a portion of the restricted area boundary of FIG. 1C.

There is shown in FIG. 1D, a plan view of the placement of the antenna 120 about the boundary of the restricted area 122 and the relationship of the first and second alert zones 128a,b to the antenna 120. The first alert zone 128a extends outward from the second alert zone 128b and covers the area about the restricted area 122 where a cart operator is to be given a warning that the cart is approaching a restricted area. While in FIG. 1D the first alert zone 128a covers an area on either side of the antenna 120, it should be recognized that the first alert zone 128a may also be established so it lies outside the area bounded by the antenna 120. The second alert zone 128b is the zone in which a cart operator should receive a warning that the cart is in a restricted area. Also, the signal receiving, processing and display means of the present invention should begin, as discussed below in connection with FIG. 3A, to accumulate information wanted by the golf course representatives concerning such restricted area intrusions by golf carts.

The size of the area bounded by the antenna 120 is set based on such factors as the size of the area to be protected, the distance a cart is to be permitted to travel before the second warning is entered and before information accumulation is to begin (i.e, the size of the warning area), and the power levels available for the transmitters. Preferably, the power output selected for the transmitter is such that the electromagnetic signals being radiated by the antenna 120 will cover at least the entire area bounded by at least the antenna 120 and more particularly at least the area comprising the first and second alert zones 128a,b. For example, a transmitter with a power output of about 40–50 watts that radiates a 22.2 kHz pulsed signal from the antenna 120 would be generally sufficient to encompass the area typically bounded by the antenna and extend a distance outward from the antenna 120.

The interface boundary 129 between the first and second alert zones 128a,b is set so a cart operator has sufficient time and distance to change the golf cart's direction after entering the first alert zone 128a such that the cart does not intrude into the second alert zone 128b and correspondingly the restricted area 122. The setting of the interface boundary 129 takes into consideration the estimated speed of the cart, the amount of time typically taken for a cart to change direction, and the minimum distance available for a golf cart 124 to travel before it would enter the restricted area after a signal from the antenna 120 is first received. After a cart has entered or is considered to have entered the second alert zone 128b, as explained in connection with FIG. 3A, the cart will be considered to be in this zone until it departs from at least the area bounded by the antenna 120 or until it departs the first alert zone 128a (i.e., signals from antenna 120 no longer being received).

Figure 1E:
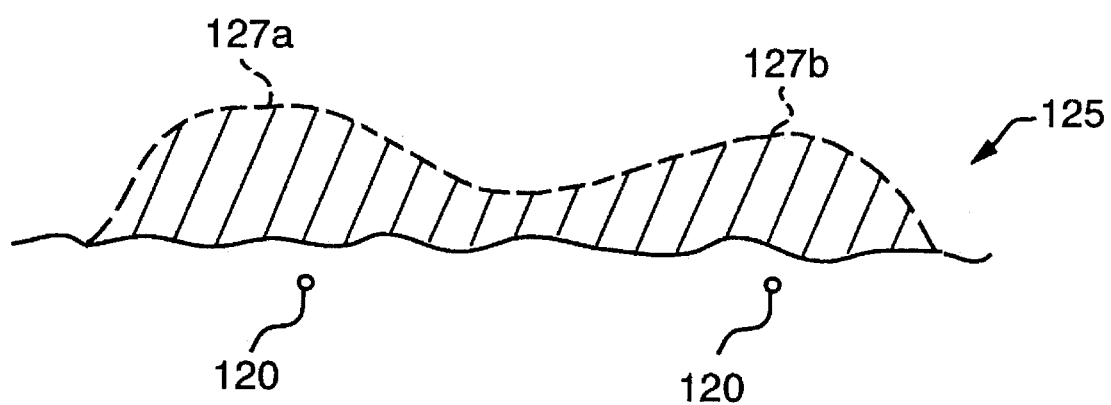
FIG. 1E is a cross section view of a typical above ground electromagnetic field strength distribution for a single antenna apparatus of the present invention.

A cross section of a typical electromagnetic field strength distribution 125 for a single loop antenna 120 that covers the first and second alert zones 128a,b and the restricted area 122 is shown in FIG. 1E. As illustrated, the directionality of the receiver's antenna may affect the field strength distribution in particular where the maxima 127a,b occur.

As discussed in connection with FIGS. 3A, B, the signal receiving, processing and display means 126,226 preferably includes an external visual alarm 146,246 that is visible to course rangers and/or other course personnel as they patrol the course. Alternatively, the external visual alarm 146,246 may be a separate unit, such as a light bar mounted elsewhere on the cart. The external visual alarm 146,246 allows a course ranger to identify carts 124,224 located in restricted areas 122,222 so appropriate action can be taken, such as requesting the operator to remove the cart from the restricted area.

Figure 2A:
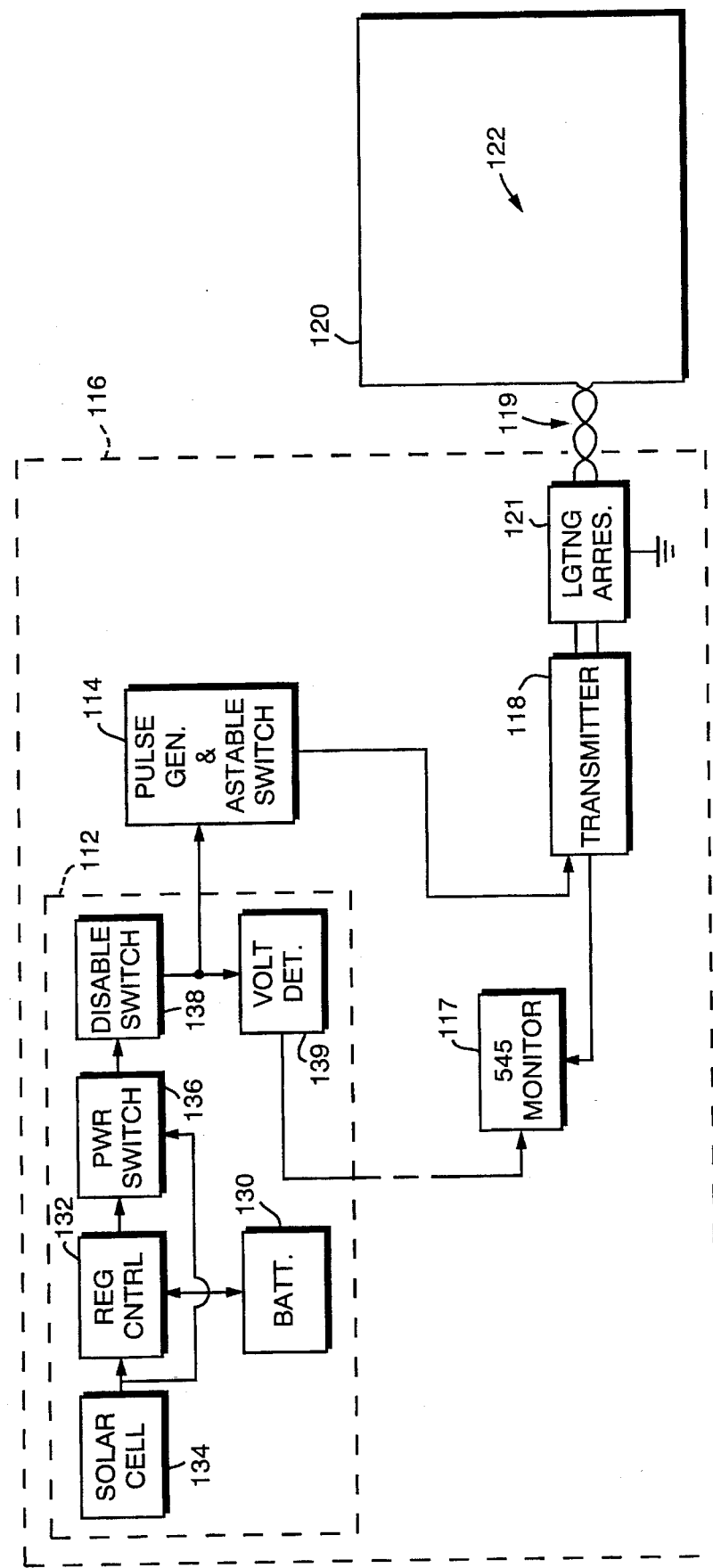
FIG. 2A is a block diagram of the antenna and signal transmission means of FIG. 1C.

There is shown in FIG. 2A, a block diagram of the signal transmission means 116 and associated antenna 120 for the single loop antenna of FIGS. 1C–E. The signal transmission means 116 includes a power supply 112 and a pulse generator and astable switch 114 which provides pulsed power to the transmitter 118 for a predetermined time period. In this way, unique electromagnetic signals having a finite time duration are generated by the transmitter 118 and radiated by the antenna 120. For example, the transmitter 118 provides signal pulses having a duration of 10–20 milliseconds every 200 milliseconds.

The power output of the transmitter 118 is selected, as discussed above in connection with FIGS. 1C–E, so the electromagnetic signals being radiated preferably cover the area within the first and second alert zones 128a,b. The transmitter's frequency is selected based on the frequencies available from the applicable regulating governmental authorities (e.g., FCC) for the intended purpose and the power outputs permitted with and without a license from the regulatory authorities. It should be recognized that the transmitter frequency and power output that can be selected are subject to governmental regulation of the country in which the antenna 120 is located.

In a preferred embodiment, the power supply 112 consists of a rechargeable battery 130, a regulating and control device 132, and a solar cell 134. The power supplied to the pulse generator and astable switch 114, comes from the solar cell 134 and/or the battery 130. The solar cell 134 is also used to recharge the battery 130. The regulation and control device 132, known in the art, controls the power distribution from the battery 130 and solar cell 134, as well as charging of the battery 130.

Since golfing is normally done during daylight hours, the power supply includes a power supply control switch 136 so power is supplied to the pulse generator and astable switch 114 only when there is daylight (i.e, battery power not depleted by running the transmitter 118 at other times of the day). Preferably, the output from the solar cell 134 is used to control the operation of the power supply control switch 136. Alternatively, a sensor such as a photocell, timers or other means known in the art may be used to control the power supply control switch 136.

The power supply 112 also includes an off season disable switch 138 and a voltage level detector 139. The disable switch 138, which may be a mechanical type of switch, is provided so the battery 130 can be trickle charged during the off season while preventing electromagnetic signals from being radiated. The voltage detector 139 monitors the power supply voltage output and provides an output signal to an output system monitor 117.

A lightning arrester module 121, as is known in the art, is electrically interconnected between the antenna 120, lines 119, and the transmitter 118. The arrester module 121 is provided to protect the antenna 120, the lines 119, the transmitter 118, the power supply 112 and associated circuitry from the effects of lightning strikes. Each arrester module 121 is also electrically connected to ground, as is known in the art, so excess energy from the lightning strike, which could damage the above identified components, is dissipated to ground.

As discussed above in connection with FIGS. 1C–E, the antenna 120 is located about a restricted area 122 of the golf course so a golf cart cannot enter the restricted area without first passing through the electromagnetic field radiating from the antenna 120. The lines 119, interconnecting the lightning module 121 to the antenna 120, are typically twisted so an electromagnetic signal is not radiated therefrom and so a false signal is not provided to the signal receiving, processing and display means 126 (see FIG. 3A).

The transmitter 118 is provided with an output system monitor 117 that monitors the output status of the transmitter, the electrical integrity of the antenna path from the transmitter, and the power supply output voltage. The system monitor 117 may be any of a number of devices known in the art, however, the monitors preferably have an LCD display.

The system monitor 117 provides indications to identify when the power supply voltage (as indicated by the voltage level detector output) falls below a prespecified level; to identify when the transmitter output has fallen below a prespecified value; to identify when the transmitter has failed; or to identify when there is a break in the antenna/ arrester module loop. For example, to indicate a low power voltage condition the LCD display is switched off and to indicate when other problems or unsatisfactory conditions are present, the LCD display is made to blink.

Figure 3A:
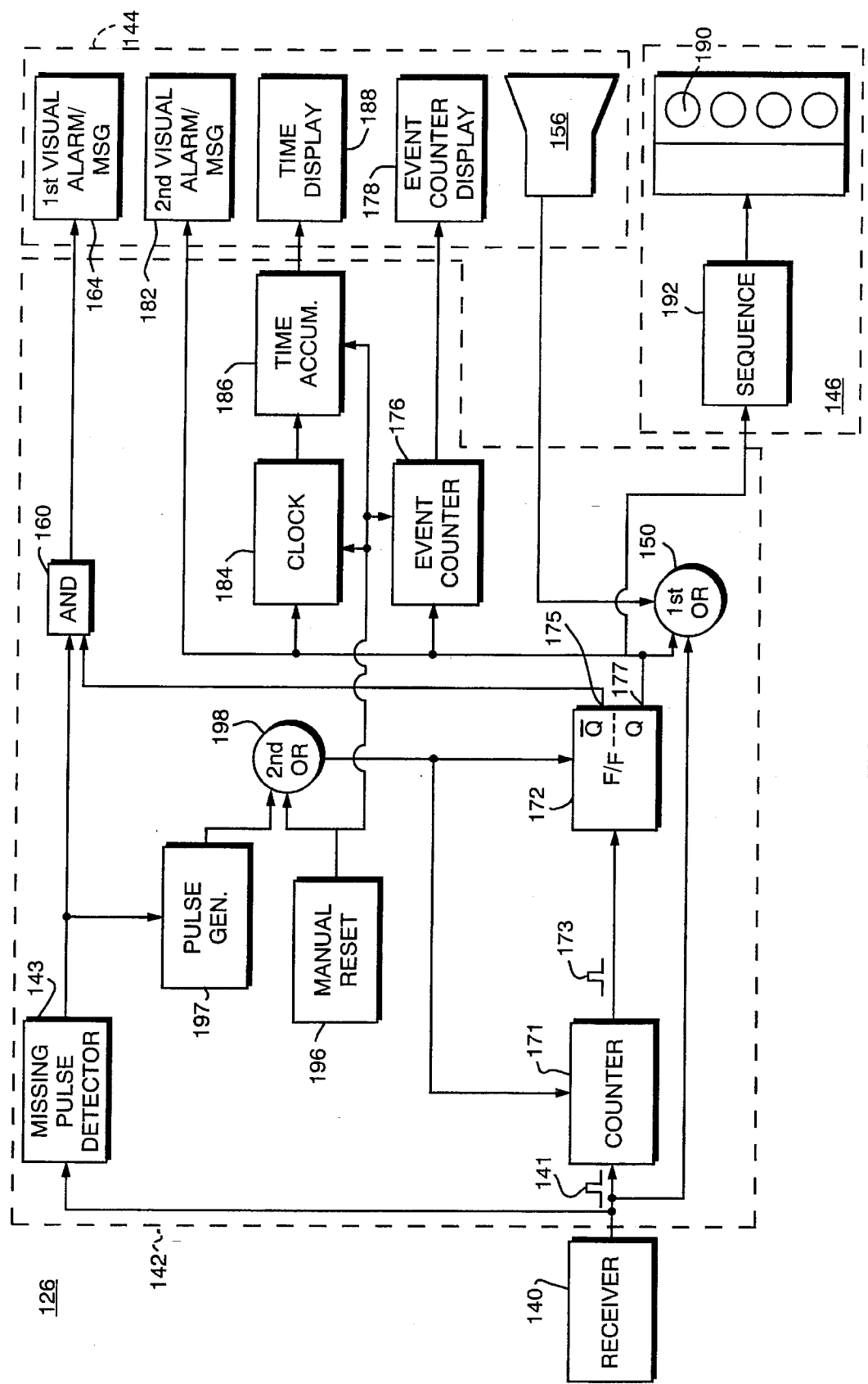
FIG. 3A is a block diagram of the electromagnetic signal receiving, processing and display means for a single antenna configuration.

As shown in FIG. 3A, the signal receiving, processing and display means 126 for the single antenna configuration of FIG. 1C includes a receiver 140, a signal processing means 142, a display means 144 and an external visual alarm 146. Preferably, the receiver 140, antenna 120 and transmitter 118 combination for each restricted area 122 establishes an omni-directional antenna system that is not susceptible to angular orientation of the cart in a single plane established by the antenna 120.

Preferably the transmitter 118 (FIG. 2A) has a power output such that electromagnetic signals being radiated from the antenna 120 cover the area defined by the first and second alert zones 128a,b. As such, when a golf cart 124 is in either the first alert or second alert zone 128a,b (see FIG. 1D), the receiver 140 receives the electromagnetic signals being radiated from the antenna 120 (see FIG. 1D,E) and the receiver provides a pulsed output signal 141 representative thereof.

The receiver pulsed output signal 141 is provided to the signal processing means 142. In response to the pulsed output signal 141, the signal processing means 142 outputs signals to the display means 144 so the appropriate visual alarms/messages 164, 182 and auditory alarms 156 are actuated to indicate that the golf cart is in either the first or second alert zone 128a,b. The following describes how the signal processing means 142 and display means 144 accomplishes this.

The receiver pulsed output signal 141 is provided to a missing pulse detector 143, a first OR gate 150, and a pulse counter 171. The pulsed output signal 141 causes the first OR gate 150 to actuate an auditory alarm 156 for the duration of the receiver's pulsed output signal 141. Since the electromagnetic signal radiated by the outer antenna 120 is a repetitive pulse, the auditory alarm 156 will provide a chirping type of sound as it is turned on and off (e.g., by a switch responsive to the first OR gate 150) in response to the pulsed electromagnetic signal from the antenna 120. As discussed below, the second flip-flop output 177 is also inputted to the first OR gate 150 to actuate the auditory alarm.

As indicated above, the pulsed output signals 141 from the receiver 140 are provided to a missing pulse detector 143 that provides a continuous output signal for as long as it receives a string of pulses 141 from the receiver 140 at predetermined intervals. The continuous output of the missing pulse detector 143 is provided to a pulse generator 197, whose operation is discussed hereinafter in connection with the resetting of the flip-flop 172, and provided to an AND gate 160. Also inputted to the AND gate 160 is the first flip-flop output 175. When the flip-flop 172 is set, indicating that the cart 124 is in the second alert zone 128b, the first flip-flop output 175 to the AND gate 160 effectively blocks any AND gate signal outputs.

If the flip-flop 172 is in its reset state, the signal from the first flip-flop output 175 provides a permissive input to the AND gate 160 so the AND gate provides an output signal when it receives a signal from the missing pulse detector 143. When the missing pulse detector 143 provides a continuous output signal, the AND gate 160 provides an output signal that actuates the first visual alarm or causes the first visual message to be displayed until the missing pulse detector's 143 output signal is stopped or the flip-flop 172 is put into its "set" state. Alternatively, the first visual alarm/first visual message display 164, using techniques known in the art, instead of providing a continuous display may be made to flash (i.e., repetitively turn on and off) to distinguish it from the second visual alarm/visual message display 182.

As discussed above, the interface boundary 129 between the first and second alert zones 128a,b is set so a cart operator has sufficient time and travel distance to turn the golf cart around after entering the first alert zone 128a so that the cart does not intrude into the second alert zone 128b. If the cart 124 continues to travel in or about the first alert zone 128a or travels further and enters into the second alert zone 128b, a second signal is generated to indicate that the cart is located in the second alert zone 128b or the restricted area 122. That is, if the cart has not exited the first alert zone 128a prior to the generation of the second signal, then the cart is presumed or considered to be in the second alert zone 128b for monitoring and alarm purposes.

For the single loop antenna 120 of FIGS. 1C–E, a pulse counter 171 is preferably used to accomplish the second signal generation function. It is within the scope of the present invention to use other means well known in the art for generating a signal after satisfying a precondition requirement. For example, a timer circuit/component may be provided that starts when signal pulses are received indicating that the cart is located in the first alert zone 128a. In this case, when a preset amount of time has elapsed the timer circuit/component provides an output signal to trigger the functions associated with the second alert zone (e.g., incrementing of the event counter 176). Alternatively, means could be provided for determining the distance traveled by the golf cart to determine if it exceeds a preset number (e.g., equating the number of cart wheel revolutions to a travel distance).

The pulse counter 171 is incremented by one for each pulse output signal 141 from the receiver 140. When a predetermined number of counts or pulse output signals is reached, the pulse counter 171 generates a signal pulse 173 that is inputted to the flip-flop 172. The flip-flop 172 may be any flip-flop known in the art such as a J-K master/slave flip-flop. The predetermined number of counts is representative of the time needed for a cart 124 to travel the distance between the point at which signals are first received from the antenna 120 and the point at which the cart would enter a restricted area (e.g., the distance between the outer edge of the first alert zone 128a, and the interface boundary 129). The counter signal pulse 173 sets the flip-flop 172 and correspondingly changes the first and second outputs 175, 177 of the flip-flop.

As indicated above, the first flip-flop output 175 is provided to the AND gate 160. When the signal from the first flip-flop output 175 changes (e.g., signal goes from high to low), the changed output inhibits the AND gate 160 from passing further signals so that the first visual alarm/first visual message 164 is turned off. The second flip-flop output 177 is provided to a second visual alarm/visual message means 182, an event clock 184, an event counter 176, the first OR gate 150 and the external visual alarm 146. When the second flip-flop output 177 is changed (e.g., signal goes from low to high), responsive to the generation of the pulse counter's signal pulse the auditory alarm 156 is changed, the visual alarm/visual message being displayed is changed and the external visual alarm, 146, the clock 184 and event counter 176 are actuated.

In this way, the flip-flop 172 outputs a signal when a cart is considered to have crossed the interface boundary 129 and entered the second alert zone 128b (i.e. a signal representative of a cart being in the restricted area). The changed first and second flip-flop outputs 175,177 are maintained by the flip-flop 172, effectively sealing in a signal representing a cart located in the restricted area until, as discussed below, the state of the flip-flop 172 is changed (i.e., flip-flop reset) thereby changing the first and second flip-flop outputs 175,177.

The second output of the flip-flop 172 provides a continuous signal to the first OR gate 150 so another auditory signal is sounded by the auditory alarm 156 indicating that the golf cart has entered the second alert zone 128b. The auditory signal produced by the auditory alarm 156, when it receives a signal from the second flip-flop output 177, is continuous and distinctive from the auditory signal generated when the cart is in the first alert zone 128a. It should be recognized that the auditory alarms generated for the first and second alert zones 128a,b respectively are not limited to that described above. The auditory alarms may be of any style and duration as long as the auditory signals generated for the two alert zones 128a,b are preferably distinguishable from one another.

As provided above, the first flip-flop output 175 controls the operation of the AND gate 160 used to switchably control the first visual alarm/visual message 164. When the pulse counter 171 provides an output signal representative of a cart being in the second alert zone 128b, the first flip-flop output 175 changes providing a signal that blocks any signal outputs from the AND gate 160. In this way, the first visual alarm/message is turned off when the cart is considered to have entered the second alert zone 128b. This blocking signal from the first flip-flop output 175 is maintained by the flip-flop 172 until the cart has exited the first alert zone 128a when, as discussed below, the flip-flop 172 is reset.

When the second flip-flop output 177 changes responsive to a signal from the pulse counter 171, the event counter 176 is incremented by one. The event counter 176 continues to increment by one each time the pulse counter 171 exceeds the predetermined number of counts for the first time, which is representative of a cart crossing into the second alert zone 128b from the first alert zone 128a. As such the event counter 176 contains a running total of the number of times a cart has entered into the second alert zone 128b (i.e., the restricted area).

The event counter display 178 of the display means 144 reflects the count stored in the event counter and is updated each time the event counter 176 is incremented. As such, the total number of times a cart has entered into a restricted area (i.e., the second alert zone 128b), during a game or the use of cart, is continuously displayed for the cart operator's information. In addition, this information is available to the course representatives during or after a game so that appropriate action can be taken to hold the cart operator accountable for the intrusion into restricted areas.

When the second visual alarm/visual message 182 receives the signal from the second flip-flop output 177, the second visual alarm/visual message 182 is actuated, where the second visual alarm/visual message 182 is distinctive from the first visual alarm/visual message 164. Preferably, the first and second visual alarms/visual messages 164,182 have a distinctive color (e.g., yellow and red lights) and the first and second visual message displays provide different messages for each zone. Also, the first and second visual alarms/visual messages 164,182 may both flash or both may stay lit continuously as long as the visual alarms/visual messages being displayed are distinguishable from each other. Since the changed output signal is continuous, the second visual alarm/visual message 182 is maintained until the flip-flop is reset when the cart exits the first alert zone 128a.

The event clock 184 is started upon receipt of the changed signal from the second flip-flop output 177 and it continues to run for as long as the cart is considered located within the second alert zone 128b. When the cart exits the first alert zone 128a, the flip-flop 172 is reset stopping the clock 184. The time accumulator 186 monitors the clock 184 and increments itself a specified amount after the clock has passed through a defined period of time (e.g., the time accumulator increments 0.1 after the passage of every 6 seconds of the clock). Thus, the time accumulator 186 maintains a running total of the amount of time a cart is considered to have been located in the restricted areas of a golf course.

The time display 188 reflects the total amount of time contained in the time accumulator 186 and is updated each time the time accumulator 186 is incremented. As such, the total amount of time the cart is considered to be in restricted areas (i.e., the second alert zone 128b) is continuously displayed for the cart operator's information. In addition, this information is available to course representatives during or after a game so that appropriate action can be taken to hold the cart operator accountable for the intrusion into the restricted areas.

The external visual alarm 146 is also actuated by the changed output signal from the second flip-flop output 177 so course rangers can easily identify carts which are located in restricted areas (i.e., second alert zone). Preferably, the external visual alarm 146 consists of a plurality of lights 190 which are lighted sequentially (i.e., sequentially energized) by means of a sequencer 192. The sequencer 192 or the plurality of lights may include a plurality of switches, one for each light. The switches, responsive to the sequencer 192, switchabley and selectively energize each of the lights 190. Alternatively, any means known in the art for generating a visual external alarm (e.g., a strobe light, a strobe colored light) may be used.

The flip-flop 172, which is set upon receiving the signal output pulse from the pulse counter 171, preferably is automatically reset when the cart 124 exits the first alert zone 128a. Alternatively, the flip-flop 172 may be automatically reset when the cart 124 exits the second alert zone 128b and enters the first alert zone 128a, or automatically reset when the cart passes over the antenna 120 while in the first alert zone 128a. Resetting the flip-flop 172 stops the event clock 184, changes the auditory and visual alarms representative of the location of the cart and stops the external visual alarm 146.

When the cart exits the first alert zone 128a, the receiver ceases to receive signals from the antenna 120 and the continuous output signal from the missing pulse detector 143 is stopped. The termination of the missing pulse detector's continuous output signal is sensed by a pulse generator 197. Upon sensing the loss of this continuous output signal, the pulse generator 197 generates a signal pulse that is provided to a second OR gate 198 which is electronically interconnected to the pulse counter 171 and the flip-flop 172.

The pulse signal from the pulse generator 197 is used to reset or initialize the counter 171 and to reset the flip-flop 172 so that all activities associated with a cart being considered located in the second alert zone 128b described above return to a quiescent state. In this way, if the cart 124 enters the first/second alert zones 128a,b of another protected area, then the above described functions of the signal processing means 142, the display means 144 and the external visual alarm 146 are repeated.

A manual reset 196 is provided so the cart 124 can be used again and again while providing the necessary monitoring information for each operator of the cart. The manual reset 196 is electrically interconnected to the event counter 176, the event clock 184, and the time accumulator 186 so when the manual reset is actuated these components are initialized or reset (e.g., the event counter reset to zero).

The manual reset 196 is also electrically interconnected to the second OR gate 198 so that when the manual reset 196 is actuated the flip-flop 172 and pulse counter 171 receive a reset signal from the second OR gate 198. This provides a means for resetting the flip-flop 172 and the pulse counter 171 in the event that they become erroneously locked in a condition representative of a cart being in the second alert zone 128b (e.g., flip-flop does not automatically reset but remains locked in the "set" condition or state).

Figure 1F:
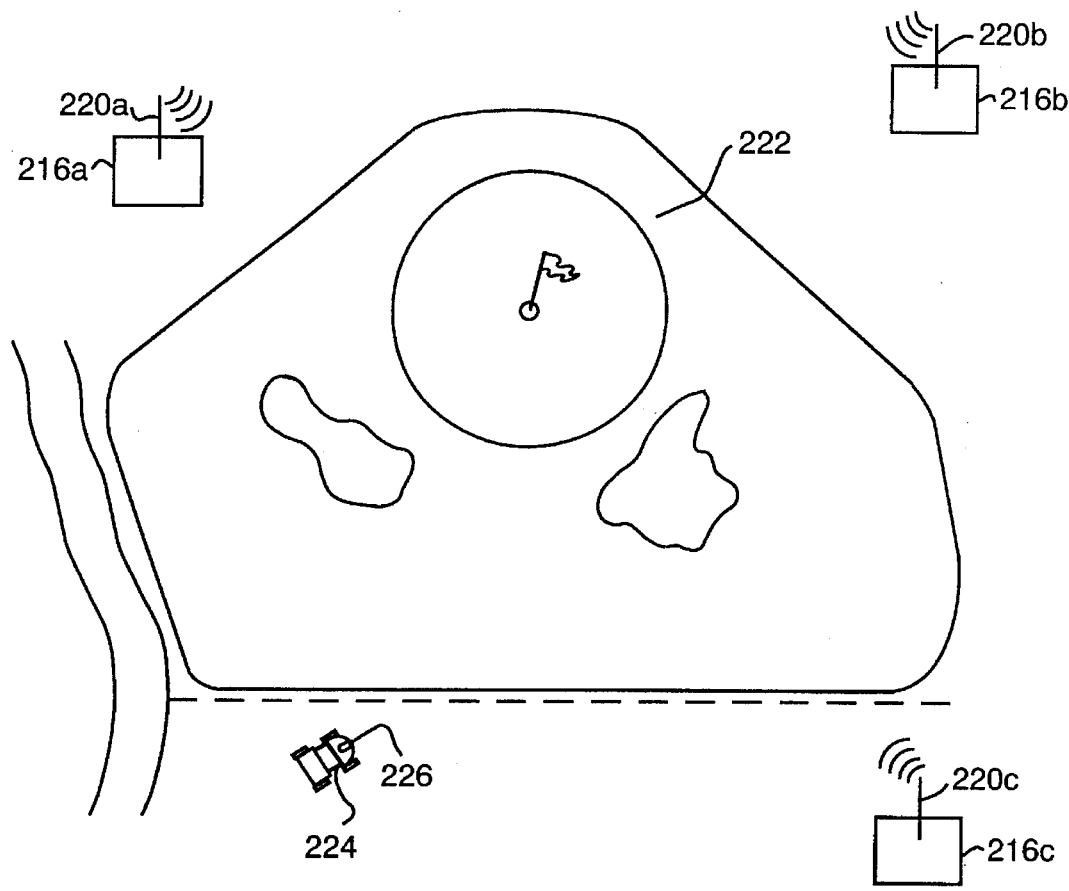
FIG. 1F is a plan view of a restricted golf course area where a plurality of antennas are disposed about a restricted area.

For the antenna/receiver configurations of FIGS. 1A–E, the position of the golf cart is determined based on the physical arrangement of the antennas about each restricted area 22,122 of the golf course (e.g., antennas bound, encircle or encompass area to be protected) and the extent of signal coverage from these antennas. There is shown in FIGS. 1F,G yet another embodiment of the present invention where the position of the golf cart with respect to a restricted area does not require arranging an antenna(s) about each restricted or protected area to define the boundary of each restricted area and the different alert zones. Rather for this embodiment, the position of the golf cart is determined based on the signals radiating from a plurality of remotely located antennas 220a–c.

In FIG. 1F, a plurality of antennas 220a–c and associated signal transmission means 216a–c are disposed about and generally beyond (i.e., external to) the boundary of the restricted area 222. The antennas 220a–c are spaced from each other and located so that they do not interfere with golf play or maintenance activities such as the cutting of grass. As provided in the discussion for FIG. 3B, the golf cart's signal receiving, processing and display means 226 uses the signals being radiated by these antennas to determine the location of the cart 224 on the golf course in the area covered by the antenna signals and with respect to the restricted areas 222. Then, using this information the signal receiving, processing and display means 226 responds in one fashion when the golf cart 224 is approaching the restricted area 222 (i.e., located in a warning area, the first alert zone 228a) and responds in another fashion when the golf cart 224 is located in the restricted area 222 (i.e. the second alert zone 228b).

While FIG. 1F depicts the antennas 220a–c and associated signal transmission means 216a–c as being located spaced from each other at a restricted area 222, preferably the antennas 220a–c and associated signal transmission means 216a–c are disposed about the golf course so the signals being radiated cover a substantial area or portion of the golf course and necessarily a number of the restricted areas. In general, the antennas 220a–c, are located about the golf course to define a triangle encompassing the area of the golf course to be covered.

Given the known locations of the antennas 220a–c, the signals radiating from the antennas are used to determine the position of the golf cart 224 with respect to any of a number of restricted areas (i.e., antennas cover more than one restricted area). The number of antennas and signal transmission means being used is established giving due consideration to the power output of each transmitter, the geographical and topographical layout of the golf course, the location and type of protected areas, the sensitivity of the receiver and the complexity of the electronics making the positional calculations/determinations.

Figure 1G:
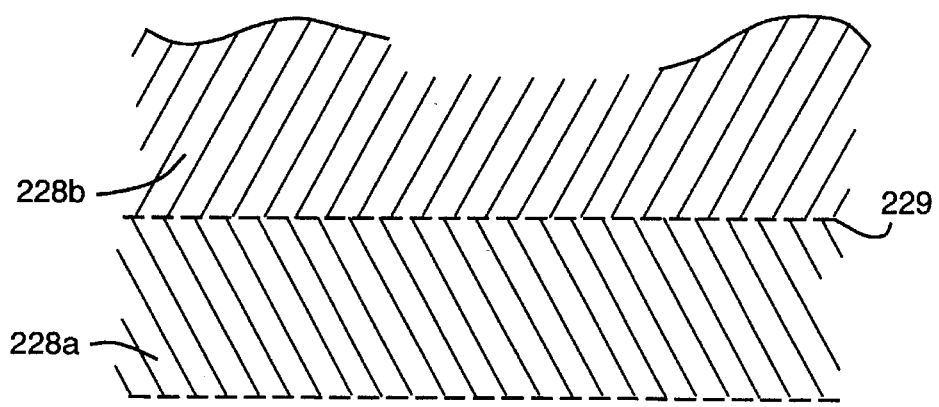
FIG. 1G is a plan view of a portion of the restricted area boundary of FIG. 1F.

As shown in FIG. 1G, two alert zones, a first and a second alert zone 228a,b are defined for each protected area 222. As with FIG. 1B,1D, the first alert zone 228a extends outward from the second alert zone 228b and covers the area about the restricted area 222 where a cart operator is given a warning that the cart 224 is approaching a restricted area. Similar to FIGS. 1B,1D, the interface boundary 229 between the first and second alert zones 228a,b is set so that a cart operator has sufficient time to change the golf cart's direction after entering first alert zone 228a.

The second alert zone 228b is the area or zone in which a cart operator receives a warning that the cart is in a restricted area 222 and where the signal receiving, processing and display means 226 of the present invention begins, as discussed below in connection with FIG. 3B, to accumulate information wanted by the golf course representatives concerning such restricted area intrusions. As explained in connection with FIG. 3B, the alert zones 228a,b and the associated interface boundary 229 for each protected area 222 are easily adjusted or modified by course representatives and does not involve hardware changes at protected areas thereby avoiding expensive and time consuming installations that affect the grounds of the golf course. The size of the area bounded by the first and second alert zones 228a,b and the size of each alert zone is set based on such factors as the size of the restricted area to be protected, the distance a cart is permitted to travel before a second alert zone warning is generated, the available power levels for the transmitter and the accuracy of the positional calculations/determinations being made.

The transmitter means 216a–c each transmit repetitive RF ranging signals from the corresponding antennas 220a–c. The ranging signal pulses from the antennas 220a–c are sequentially staggered in a predetermined order to define a set of sequentially spaced, in time, ranging signal pulses. There is also a time gap between each set of ranging signal pulses that is substantially greater than the time gap between the successively transmitted ranging signal pulses of a set. In this way, the first ranging signal pulse of each set is readily identifiable and there is also defined a plurality of repetitively transmitted ranging signal pulses. As provided in the discussion for FIG. 3B, the sets of ranging signals are used to determine the position of the golf cart on the golf course and more particularly, the position of the cart with respect to areas to be protected about the golf course.

Since the ranging signal pulses being transmitted are staggered in time and to simplify the construction of the receiver, the transmitter means 216a–c preferably generate RF signals at the same frequency. The RF frequency selected is one of the frequencies in the frequency range permitted by the governmental authorities for the intended use and the expected power output.

While single frequency operation is preferred, it is within the scope of the present invention to transmit ranging signal pulses at different RF frequencies. It also should be recognized that there a number of techniques known in the art whereby a position can be determined by receiving a plurality of signals from known receiver locations. For example, the bearing of each signal from fixed radio transmitters at known locations may be used to determine the position of the golf cart. As such, it is within the skill of those in the art to modify the within apparatus to use one of these other position determining techniques.

Figure 2B:
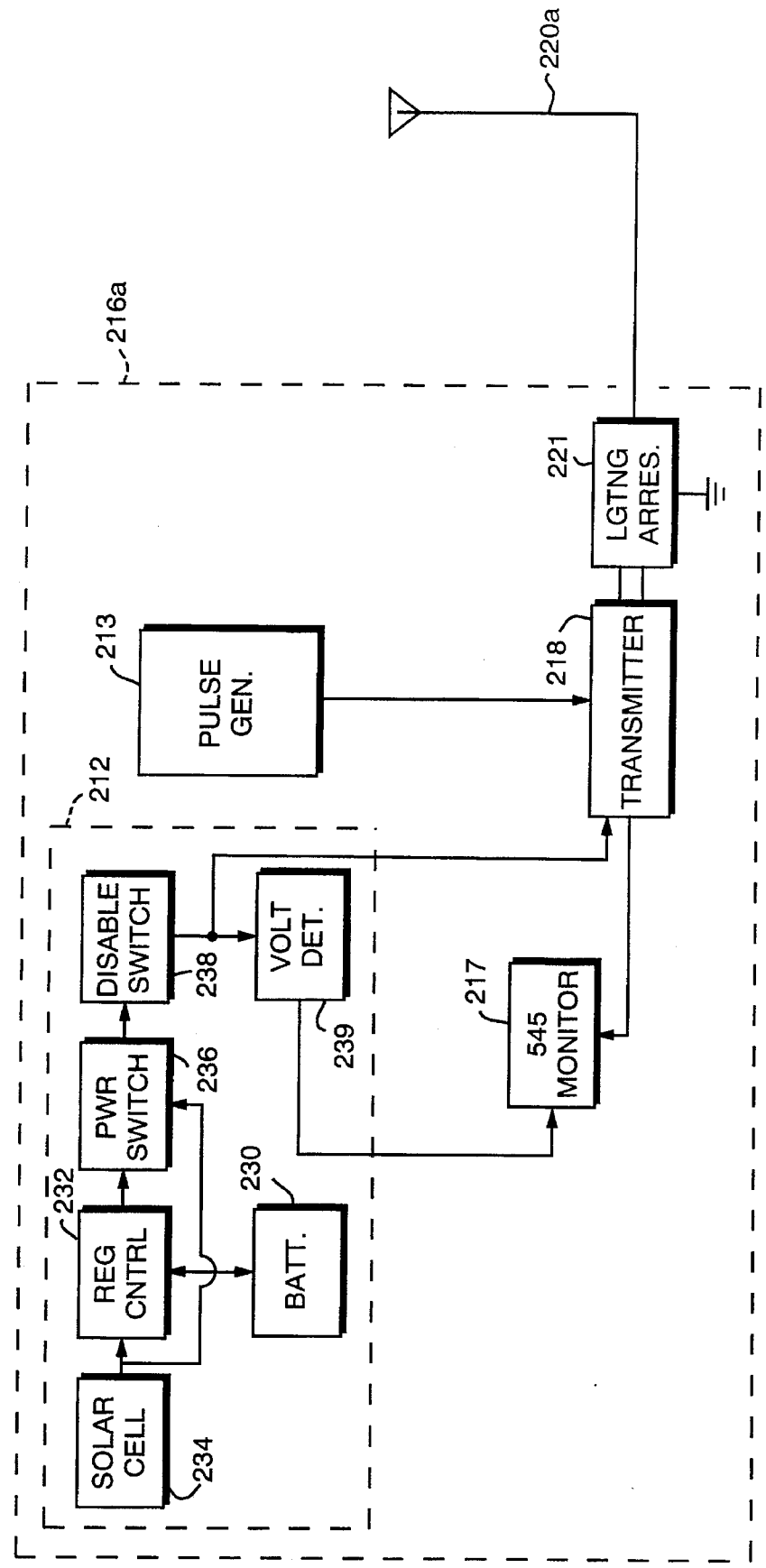
FIG. 2B is a block diagram of an antenna and signal transmission means of FIG. 1F.

There is shown in FIG. 2B, one signal transmitter means 216a and its associated antenna 220a of FIGS. 1F–G. Each antenna 220a is disposed above ground and, as indicated above, is located at a known position about the golf course. Each signal transmitter means 216a includes a power supply 212, a transmitter 218 and a pulse generator 213.

The pulse generator 213 preferably controls the transmitter 218 so a plurality of signal pulses are repetitively generated and radiated by the antenna 220a. The pulse generator 213 also sequences the generation of the signal pulses, so as indicated above, the pulses from each of the transmitters 216a–c are sequentially staggered at a preset interval. In this way, a set of ranging signals are generated.

The power supply 212 preferably consists of a rechargeable battery 230, a regulating and control device 232, and a solar cell 234. The power supplied to each transmitter 216a comes from the solar cell 234 and/or the battery 230. The discussion above concerning the power supply 112 of FIG. 2A should be referred to for a description and function of the solar cell 234 and the regulation and control device 232. While the foregoing discussion refers to a single battery 230 and solar cell 234, the power supply 212 of the instant invention may be configured to use a plurality of batteries and/or solar cells depending upon the power requirements and reserve power requirements for a given application.

As with the power supply 112 of FIG. 2A, this power supply 212 includes a power supply control switch 236 so power is supplied to each transmitter 218 only when there is daylight (i.e, battery power not depleted by running the transmitter at other times of the day), an off season disable switch 238, a voltage level detector 239, a lightning arrester module 221, and an output system monitor 217. In general, the discussion above concerning the power supply 112 of FIG. 2A should be referred to for a description and function of these features for the power supply 212 of FIG. 2B, as well as any alternate embodiments for these features.

It is also within the scope of the instant invention for each of the transmitters 216a–c to be powered from a central power source rather than batteries and/or solar cells. In this case, the power supply 212 may still be selectively switched on and off depending upon the time of day (i.e., it is daylight) and the time of year (i.e., golfing season).

Figure 3B:
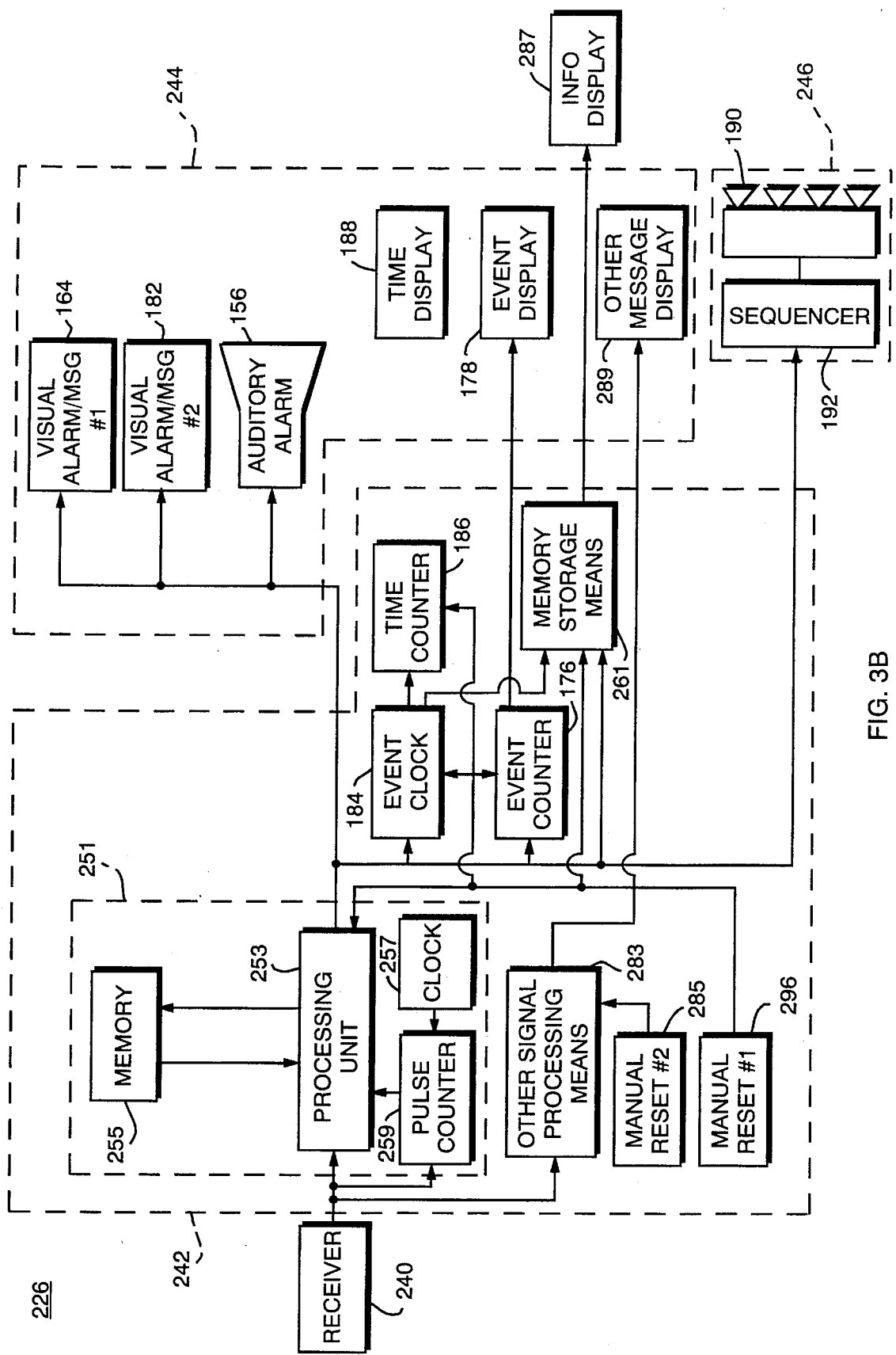
FIG. 3B is a block diagram of the electromagnetic signal receiving, processing and display means for a FIG. 1F antenna configuration.

There is shown in FIG. 3B a signal receiving, processing and display means 226 that receives the ranging signal pulses from the antennas 220a–c and determines the position of the golf cart 224 based on these signal pulses. Preferably, the signal receiving, processing and display means 226 includes position determining and control signal output means 251 that determines the location of the cart on the golf course and specifically if the golf cart is located in the first or second alert zone 228a,b defined for each protected area 222. The position determining and control signal output means 251 outputs control signals to the display means 244 when the cart is determined to be located in the first or second alert zone 228a,b and also outputs control signals to the event counters 176 and event clock 184 when the cart is located in the second alert zone 228b. The position determining and control signal output means 251 receives output signals from the receiver 240 that are representative of the ranging signal pulses emitted by the antennas 220a–c.

The position determining and control signal output means 251 includes a processing unit 253, an information/data storage memory 255, a clock 257, and a pulse counter 259. The pulse counter 259 is responsive to both the output signals from the receiver 240 representative of ranging signal pulses and the clock pulses from the clock 257. The operation of the position determining and control signal output means 251 is best understood from the following discussion.

The processing unit 253 is a central processing unit such as a 8051 microprocessor as well as other processing units (e.g., 8 bit, 16 bit, 32 bit microprocessors) known in the art that can be used to perform the below described positional determination and signal output functions. The processing unit 253 cooperates with the information/data storage memory 255, the pulse counter 259 and the clock 257 to process the ranging signal pulses from the antennas 220a–c to determine the location of the golf cart as it travels about the golf course. The ranging signal pulses are received by the receiver 240, that outputs signals representative thereof to the pulse counter 259.

The pulse counter 259 begins to count clock pulses from the clock 257 upon receipt of the first ranging signal pulse in each set of three ranging signal pulses received by the receiver 240. When the second pulse in the set is received, the counter 259 provides a first count signal indicating the accumulated count between the first and second pulses to the processing unit 253. The counter 259 is reset upon receiving the second ranging signal pulse and the counter 259 again counts clock pulses from the clock 257. Upon receiving the third pulse of the set, the pulse counter 259 sends a second count signal indicating the accumulated count between the second and third pulses to the processing unit 253 and the counter 259 is again reset so the process is repeated for the next set of ranging signal pulses.

The processing unit 253 processes the first and second count signals from the pulse counter 259 in combination with the remote station transmitter-location data stored in the information/data storage memory 255 to determine the coordinates of the location of the golf cart 224 on the golf course. This is done using typical prior art range determination processing techniques based upon measuring the relative time of arrival of at least three ranging signals.

Alternatively, the information/data storage memory 255 contains look-up tables from which the coordinates of different locations on the golf course can be retrieved by the processing unit 253 upon the memory 255 being addressed by the source-location information associated with the respective remote station antennas 220a–c as provided in the first and second count signals received by the processing unit 253 from the pulse counter 259. The degree of resolution of the different locations is dependent upon the amount of memory capacity that is dedicated to the look-up tables.

The processing unit 253 accesses the information/data storage memory 255 to compare the location or coordinates determined for the golf cart 224 with the known coordinates of predetermined features of the golf course, in particular the known coordinates of the protected areas 222 to determine the golf cart's location with respect to a predetermined feature. In the case of protected areas, a determination is made to see if the cart is located in one of the protected areas. More particularly, the processing means compares the protected area locational information with the cart's location to determine if the golf cart is located within the first or second alert zone 228a,b of any protected area 222. It is within the skill of those knowledgeable in the art, to also provide information/data in the memory 255 to indicate what hole the golf cart is located near (i.e. what hole is being played by the golfer) to simplify the processing unit's 253 look up and comparison process. In this way, the processing unit 253 may retrieve information/data from the memory 255 for the predetermined features such as the restricted areas that are within a prespecified locus about the location of the golf cart.

As indicated above, the information/data storage memory 255 stores data indicating the location of each of the various protected areas 222 about a golf course (e.g., the stored data indicates the coordinates of the first and second alert zones) and data indicating the locations of the fixed antennas that radiate the ranging signal pulses. The storage memory 255 may be a non-volatile RAM or other data storage medium known in the art that is easily reconfigured or reprogrammed to indicate the locations of protected areas.

While the foregoing and the following describes the system in terms of taking action when the cart enters into a protected area 222, it should be recognized that the system may be alternatively configured to take action when the cart leaves a designated pathway or area and enters into an area where carts should not be traveling. For example, the signal receiving, processing and display means 226 may be configured to provide an informational message advising a cart operator to return to the designated cart pathway if the cart is driven of the pathway and onto the fairway. In these cases, the system may be configured to provide a single message and warning when the cart departs the designated area.

As indicated above, when the processing unit 253 determines that the golf cart is located in or about a protected area 222, it outputs control signals to the display means 244 and/or the event counter 176 and event clock 184. If the cart is determined to be located in the first alert zone 228a, the processing unit 253 outputs control signals to activate the first visual alarm/message 164 and the audio alarm 156 to generate a first audio output signal. When the cart exits the first alert zone (i.e., exits the protected area), the visual alarm/message and audio alarm is terminated.

If the cart is determined to be located in the second alert zone 228b, the processing unit 253 outputs control signals to activate the second visual alarm/message 182; to change the audio alarm signal being generated by the audio alarm 156 to a second audio output signal; to stop the first visual alarm/message 164; and to activate the external visual alarm 246. Further, the processing unit 253 outputs control signals to start the event time clock 184 and to index or increment the event counter 176. When the cart exits the second alert zone 228b and enters the first alert zone 228a, the event clock 184 is stopped and the visual alarm/message 182 and audio alarm signals being generated are changed back to those for the first alert zone 228a.

As with the apparatus of FIG. 3A, the time counter/accumulator 186 is incremented responsive to the output signals from the time clock 184. The time display 188 and the event counter display 178 are also incremented/updated responsive to outputs respectively from the time accumulator 186 and the event counter 176.

In an alternate embodiment, the signal receiving, processing and display means 226 includes a second memory storage means 261 that stores at least the identification of each protected area (i.e., second alert zone 228b) intruded into by a golf cart 224 and the position determining and control signal output means 251 provides an output signal to the second memory storage means 261 to identify the protected area being intruded. As indicated above, the position determining and control signal output means 251 in determining if a cart 224 is located in a protected area 222, also necessarily knows which area is being intruded. Alternatively, the second memory storage means 261 receives input signals from the event time clock 184 so the amount of time the cart 224 is located in a particular protected area is also known.

The data or information stored in the second memory storage means 261 is accessed by course representatives, preferably when the golf cart 224 is returned back to the club house or other designated location by the operator (e.g., golfer is through for the day). Preferably, the second memory storage means 261 drives an information display 287 so the information being accessed can be viewed by the course representative(s). This information can be used to determine what action, if any, should be taken to hold the cart operator accountable for their actions during operation of the cart as well as allowing the course representatives to go out and view the protected area(s) intruded upon to determine if there was any damage to the course grounds.

There are a number of situations that can arise during the play of golf where providing a message directly to the cart operator can result in improvement to course safety as well as keeping golfers generally informed of the goings on at the course. For example, a course representative could transmit a signal so the cart operator is informed of inclement weather such as thunderstorms and that the golfer should seek the safety of the club house.

To accomplish this, the signal receiving, processing and display means 226 includes other signal processing means 283 to evaluate RF signals being received by the receiver 240 to determine if an informational message is being transmitted by course representatives for the cart operator's information (i.e., the signal is not a ranging signal pulse). If a message is being received, then the other signal processing means 283 outputs a signal to the other message display means 289 so that the appropriate message is displayed to the cart's operator. The signal receiving, processing and display means 226 also may include a resetting means 285 so the cart operator can manually clear the informational message from the display 289 or so the message is automatically cleared from the message display 289, for example after a preset amount of time has elapsed.

As with the apparatus of FIG. 3A, the signal receiving, processing and display means 226 includes a manual reset 296 accessed by the course representative for resetting or re-initializing the event time clock 184, the timer counter 186, the event time display 188, and the event counter 176 so the cart can be used by another golfer/operator. Alternatively, the manual reset 296 provides an output signal to the processing unit 253 that in turn provides a control signal to reset or re-initialize the above components. If the signal receiving, processing and display means 226 is configured with a second memory storage means 261, then the reset signal is also provided to the second memory means 261 to delete old information concerning previous restricted areas intrusions.

Figure 4:
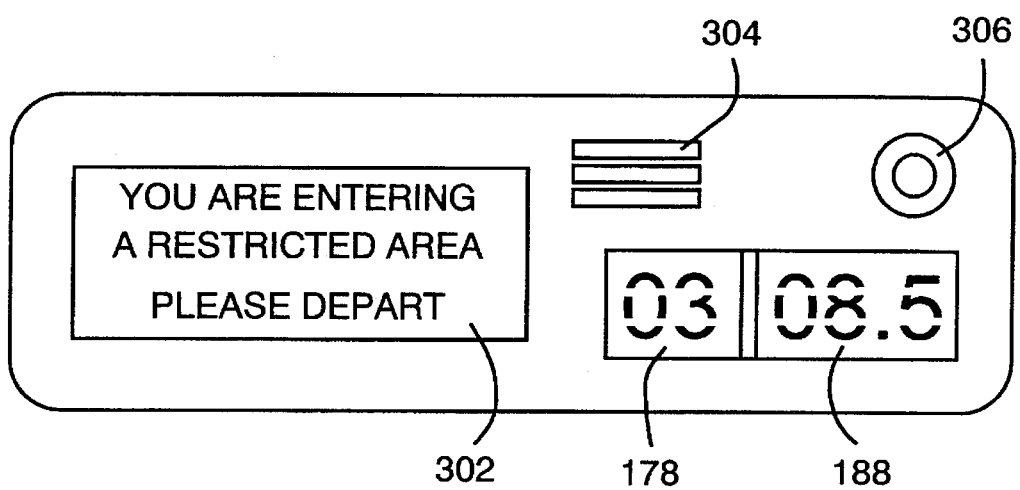
FIG. 4 is a an elevation view of the information display provided by the signal receiving, processing and display means of the present invention.

There is shown in FIG. 4 an elevation view of one embodiment of the information display 300 provided by the signal receiving, processing and display means 126,226 located on a golf cart 124,224 (FIGS. 1C,F). The informational display 300 includes a message display 302 that contains at least one pre-scripted message such as "YOU ARE ENTERING A RESTRICTED AREA-PLEASE DEPART" for display. Preferably, the message display is uniquely illuminated (e.g., by different colored lights) depending upon the location of the cart with respect to the first and second alert zones 128a,b; 228a,b. For example, when the cart is located in the first alert zone 128a,228a the message display 302 is illuminated by a yellow light and when in the second alert zone 128b,228b the message display 302 is illuminated with a red light.

Alternatively, the message display 302 contains two pre-scripted messages. The first message is "YOU ARE ENTERING A RESTRICTED AREA-PLEASE DEPART" and the second is "YOU ARE IN A RESTRICTED AREA-DEPART AT ONCE." In this embodiment, the messages preferably are uniquely illuminated corresponding with the location of the cart (e.g., first message is illuminated with a yellow light). In this way, an operator is provided with a unique visual alarm and a unique informative pre-scripted message for each of the alert zones.

The information display 300 contains a two digit event counter display 178 (see FIGS. 3A,B) that indicates the number of times a golf cart has entered into restricted areas (i.e., second alert zone) during a game. The information display 300 also contains a three digit time display 188 (see FIGS. 3A,B) that indicates the total amount of time a cart has been located in restricted areas during a game. In the illustrated example, a cart has entered restricted areas three times and has been in these areas for a total of 8.5 minutes. While two and three digit display are illustrated, this is not a limitation as the displays may have more or less digits as the actual needs may require.

A plurality of slit apertures 304 may be provided in the information display 300, to permit the passage of the auditory signal from the auditory alarm 156 (FIGS. 3A,B). The information display may also contain a lockable switch 306, as is known in the art, for use by course representatives to manually reset the signal processing means 142,242 and display means 144,244 of the present invention as explained above in conjunction with FIGS. 3A,B. In this way, a course representative can reset a cart's signal receiving, processing and display means 126,226 so the cart can be used by another operator and so the information displayed in the event counter display 178 and the time display 188 reflects the use of the cart by that operator.

It should be recognized that it is well within the skill of those in the art to adapt other types of displays for use in the subject invention. In an alternate embodiment, a liquid crystal display (LCD) is used to provide the pre-scripted messages as well as providing the time display 188 and event counter display 178. In a further embodiment, the LCD display is configured so only the pre-scripted messages are displayed to the cart operator and the time and the event counter displays 178,188 are actuated by the course representatives when they access this information from the signal processing and display means 142,144; 242,244. In this way, a cart operator is not continuously reminded by the message display of an intrusion into a restricted area throughout play but rather the event log information is available to course representatives to determine if further action is warranted.

In yet a further embodiment, the LCD display is configured to display the informational message determined by the other signal processing means 283 and/or to display the information stored in the second memory storage means 261 when accessed by the course representatives.

An exploded view of an embodiment of the signal processing and display means 126,226, including the associated housing, is shown in FIG. 5. The signal processing and display means 126,226 includes an informational display 300, top and bottom housing sections 320,322, a plurality of external visual alarm lights 190 although only one light is illustrated, and an electronics package 324 containing the circuits described above in connection with FIGS. 3A,B.

In this embodiment, the external visual alarm lights 190 are disposed opposite the informational display 300 so that the lights are not visible to the cart operator when driving the cart 124. When the top and bottom housing sections 320,322 are secured together, the light coming from the external visual alarm lights 190 shines through a clear portion 326 of the top housing 320 so a course ranger or representative can see the external visual alarm lights 190 when the external visual alarm 146 is activated. In this way the course ranger or representative can readily identify carts located within restricted areas.

Figure 1H:
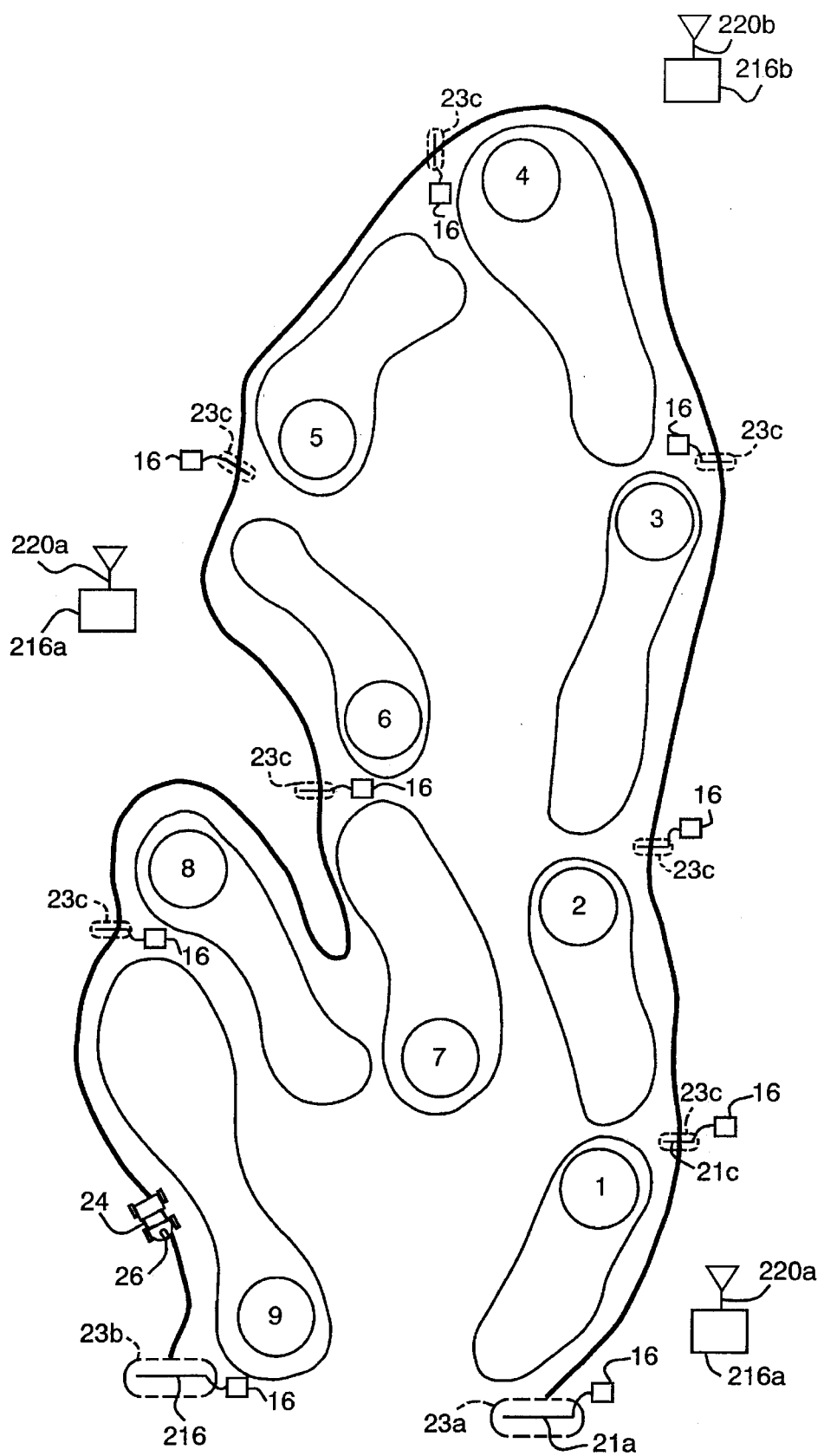
FIG. 1H is a plan view of the front nine holes for a golf course.

Golf courses are designed to challenge golfers, to utilize the available space and to maintain a pleasing environment. There is shown in FIG. 1H, the front nine holes of a golf course. Disposed about the front nine holes is a cart path 25 in which the golf carts 24 are to travel. Providing a designated path 25 for the travel of golf carts 24 is one means golf course management uses to protect areas from physical damage. The stands of trees, brooks and steams and other typical topological features of golf courses are not shown on FIG. 1H.

As shown, before a golf cart 24 enters the cart path 25, the golf cart 24 traverses a designated start area 23a that is near the first hole. The designated start area 23a is an area designated by course management as representing when a game of golf is considered to have begun and it also represents the starting point for first hole play. Correspondingly, before a golf cart 24 exits the cart path 25 it traverses a designated stop area 23b, that is near the ninth hole. The stop area 23b is representative of when a game of golf is considered to have ended for the first nine holes and it also represents the end point for ninth hole play. While two areas, a start and stop area 23a–b, are illustrated, the number of areas designated on a course as being representative of the starts/ends of play, as well as their respective locations on the course, are determined based on such factors as the number of holes on the course, how the game is played at a particular course, and the signal transmission means/antenna configuration being used to positionally locate the golfer/golf cart.

For example, on a 18 hole course it is not uncommon for golfers to play just the front nine or just the back nine; or to play the front nine, take a break, and then play the back nine; or to play the back nine and then play the front nine. In this case, start areas 23a are placed contiguous the first and tenth holes and stop areas 23b are placed contiguous the ninth and eighteenth holes (i.e., four areas would be designated) so the time of play being tracked would reflect how a game is or could be played at the course.

In addition to designating start and stop areas 23a–b, intermediate positions 23c are designated along and about the cart path 25. As illustrated, intermediate positions 23c are disposed proximate the end of each of the first six (6) holes and after the eighth (8th) hole. In general, the number and location of the intermediate positions 23c are established so they generally correspond to the completion of some part of a game (e.g., a hole or segment). For example, an intermediate position is placed so it represents the end of play for one hole and the start of play for the next hole. Alternatively, an intermediate position is established to define the end of play for one hole and another intermediate position defines the start of play for the following hole.

In one embodiment, the start/stop areas 23a–b and the intermediate positions 23c are each defined by a below grade antenna 21a–c that radiates electromagnetic signals generated by, a corresponding transmitter means 16. Although illustrated as a rod type of antenna, the antenna 21a–c used to define the area includes loop antennas and while a single antenna is illustrated, the areas 23a–c may be defined by a plurality of antennas.

In an alternate embodiment to below grade antennas 21a, a plurality of above ground antennas 120a–c, and the associated transmitting means 216a–c, are provided to transmit a set of ranging signals (see discussion regarding FIGS. 1F,G; 2B and 3B), from which the signal receiving processing and display means 26 determines the location of the golf cart 24 on the golf course. More particularly a determination is made concerning whether the golf cart 24 is located in at least an area where golf is considered to be played or in one of the designated start or end areas 3a–b. Since in this type of system, the specific location of the golfer/golf cart 24 on the golf course is determined using the ranging signals, the start area may be defined as being all locations on the course where golf is played and the end area may be defined as being all locations on the course where golf is not played. Similarly, the signal receiving, processing and display means 26, based on the ranging signals, determines whether the cart is located at one of the designated intermediate travel position 23c.

As discussed below, a signal receiving, processing and display means 26 is disposed on the golf cart 24 to receive the electromagnetic signals radiating from the antennas 21a–c defining start and stop areas 23a–b and the intermediate travel positions 23c or the ranging signals from the above ground antennas 220a–c. In this way, a golf cart 14 cannot enter one of these designated areas without the signal receiving, processing and display means 26, located on the golf cart 24, from either first receiving an electromagnetic signals radiating from one of the antennas 21a–c that define these areas 23a–c or first receiving the ranging signals from which the cart's location with respect to these areas is determined.

As discussed below, concerning FIGS. 3C–D, the circuitry of the playtime monitoring and tracking means 350a–b, is preferably included along with the signal receiving and processing means 126,226 of the present invention (see FIGS. 3A,B) so all is mounted on the golf cart 24. Alternatively, because golf carts are not always used for play, an electronic package containing the playtime monitoring and tracking means 350a–b is provided to each golfer to sense and process the electromagnetic signals representative of the start and end areas 23a–b and the intermediate travel positions 23c of the golf course.

Figure 3C:
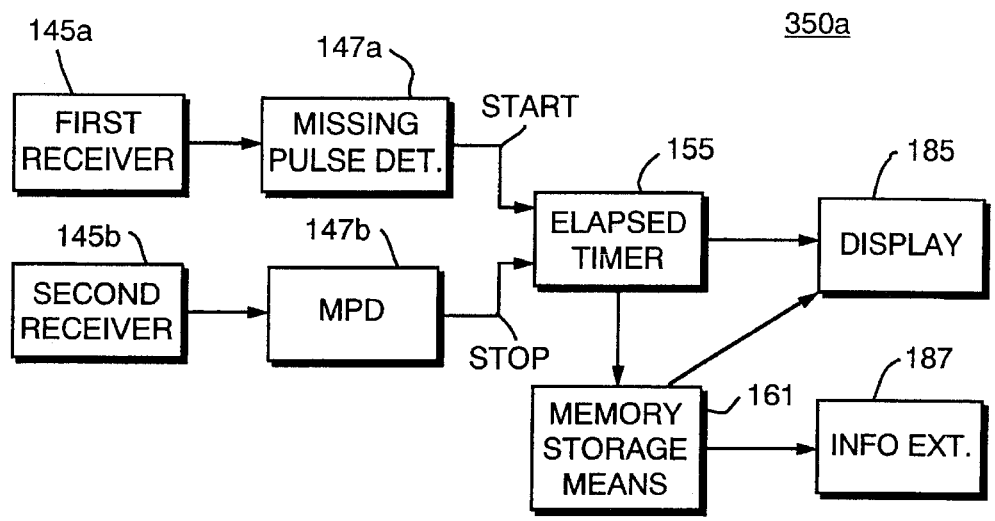
FIG. 3C is a block diagram of one embodiment for monitoring and tracking time of play.

In one embodiment, as shown in FIG. 3C, the playtime tracking means 350a is configured to receive electromagnetic signals radiating from below grade antennas 21a–c (FIG. 1H) disposed proximate the start/stop areas 23a–b and the intermediate travel positions 23c. The playtime tracking means 350a includes two receivers 145a–b, two missing pulse detectors 147a–b, an elapsed timer 155 and a display means 185 to receive and process the electromagnetic signals and to continuously display time of play. Additionally, information regarding time of play is stored in a memory means 161, so that the time of play data is retrievable by course representatives using, for example, an external information display 187.

The playtime means receivers 145a–b receive the electromagnetic signals from the transmission system disposed at each start and end area 23a–b. The transmission system for each of these areas is that shown in FIG. 2A, except that in addition to the illustrated loop antenna, other antennas such as a rod antenna are used to develop the electromagnetic field that defines each start/end area 23a–b. The electromagnetic signals being radiated at each start/end area 23a–b are periodic signal pulses (See FIG. 2A discussion). The operation and function of this embodiment of the playtime monitoring and tracking means 350a is described below.

When the playtime monitoring and tracking means 350a, or the golf cart on which it is mounted, enters a start area 23a, the transmission means signal pulses are received by the first playtime receiver 145a. This receiver outputs signal pulses in response thereto to a first playtime missing pulse detector 147a. The first playtime missing pulse detector 147a, responsive to the receipt signal pulses from the first receiver 145a outputs a signal to the elapsed timer 155 that starts the elapsed timer. Since the elapsed timer 155 is reset or initialized before beginning the monitoring and tracking function (e.g., by a course representative), the elapsed timer 155 determines the amount of time that has elapsed since the entering a start area 23a. Thus, the time reflected by the elapsed timer 155 is representative of the time of play.

When the playtime monitoring and tracking means 350a, enters an end area 23b, the transmission means signal pulses are received by the second playtime receiver 145b. The second playtime receiver 145b outputs signal pulses in response thereto to a second playtime missing pulse detector 147b. The second playtime missing pulse detector 147b, responsive to the receipt of the second receiver signal pulses, outputs a signal to the elapsed timer 155 stopping the elapsed timer. When the elapsed timer 155 stops accumulating time, for purposes of monitoring and tracking time of play, the golfer/golf cart 24 is assumed to have left the course and/or that the game is concluded.

If a golf course is provided with multiple start and end areas (See FIG. 1H discussion above), then the playtime monitoring and tracking means 350a, is started as it enters each start area 23a and is stopped when it enters each end area 23b. Since the elapsed timer 155 is not reset when the elapsed timer 155 is stopped and/or started, the elapsed timer 155 reflects the total amount of time a golfer has been on the course (i.e., the time of play for a game).

The amount of time determined by the elapsed timer 155, is displayed to a golfer on a display means 185. The playtime display means 185, may be any means known for receiving the timing information signals or clock signals from the elapsed timer 155 and displaying this information for viewing by a golfer. The display means 185 includes an LCD display that displays the time of play outputted by the elapsed timer and identifies the information being displayed on the screen as being the time of play. The time of play being displayed is periodically updated in a predetermined fashion (e.g., once a second, once a minute).

The playtime monitoring and tracking means 350a, includes a memory means 161, that receives and stores the timing information from the elapsed timer 155. The memory means 161 is accessed by course representatives to retrieve at least the time of play information for a game. For example, as discussed below regarding FIG. 3D, the time of play for a game and the time taken to play each hole may be stored in the memory means. As also provided above, the circuitry of the playtime monitoring and tracking means 350a is included along with the circuitry for the signal receiving processing and display means 126,226 of the present invention. Thus, time of play information may be displayed along with the information regarding event history (e.g., time in restricted areas).

The electromagnetic signals being radiated at each start area 23a are at a different frequency than those being radiated at each end area 23b and the associated playtime receivers 145a–b are set or configured to receive the signals at the appropriate frequency. Using different frequency signals is one technique that distinguishes signals from the start and end areas 23a–b.

Alternatively, the electromagnetic signals being radiated from at the start and end areas 23a–b are at the same frequency. In this case, differentiating between start and end areas 23a–b is based on the spacial separation between these areas (i.e., no overlap of the electromagnetic fields) and the temporal separation between signals being radiated from the antennas 21a–b at the start and end areas 23a–b. Single frequency operation allows the circuitry of the playtime monitoring and tracking means 350a to be simplified by eliminating a receiver 145b and a missing pulse detector 147b. The remaining playtime missing pulse detector 147a, in response to signal pulse outputs from the remaining playtime receiver 145a, provides both the start and stop signals for the elapsed timer 155. The first set of signal pulse outputs from the remaining playtime receiver 145a are presumed to be from a transmission means for a start area 23a and the second set of signal pulse outputs are presumed to be from a transmission means for an end area 23b. Thus, the first set of pulse outputs causes the remaining missing pulse detector 147a to output a signal starting the elapsed timer 155 and correspondingly the remaining missing pulse detector outputs a signal stopping the elapsed timer 155 responsive to the second set of receiver pulse outputs.

Figure 3D:
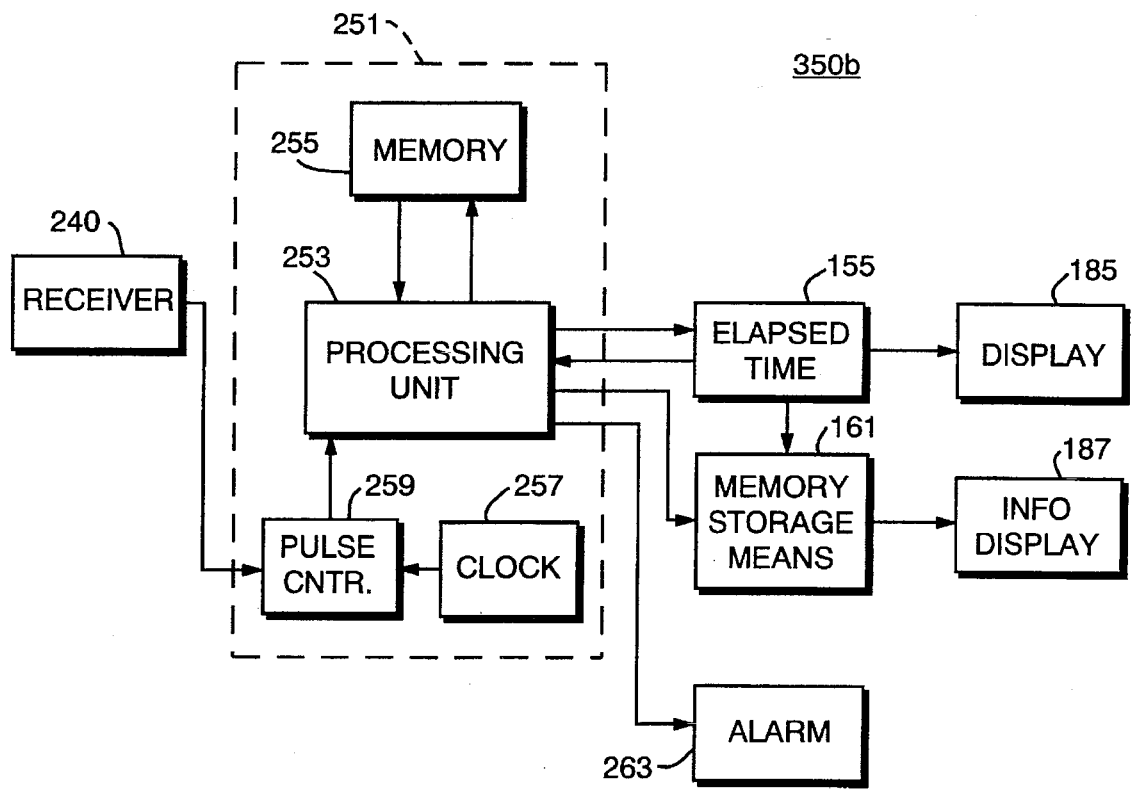
FIG. 3D is a block diagram of another embodiment for monitoring and tracking time of play.

For another embodiment, as shown in FIG. 3D, the playtime monitoring and tracking means 350b is configured to receive the electromagnetic ranging signals from a plurality of above ground antennas 220a–c (FIG. 1H). For this embodiment, the playtime monitoring and tracking means 350b includes a receiver 240, position determining and control signal output means 251, an elapsed timer 155 and a playtime display means 185. The playtime monitoring and tracking means 350b includes a memory storage means 161 for storing information concerning time of play, so that at least the time of play for a game is later retrievable by course representatives using, for example, an external information display 187.

The receiver 240 receives ranging signals from a plurality of antennas 220a–c disposed about the golf course (see discussion regarding FIGS. 1F–H, FIG. 2B and FIG. 3B). The receiver's output signals are provided to the position determining and control signal output means 251, that determines the position of the monitoring and tracking means 350b on the golf course. Using a memory 255 containing the locations of specified features about the course, including the designated start and end areas 23a,b for time of play, the position determining and control signal output means 251 determines if the position of the monitoring and tracking means 350b and the golf cart 25 corresponds to the known location of a start, an end area or one of a plurality of intermediate travel positions 23a–c.

In one embodiment, when it is determined that the playtime monitoring and tracking means 350b is in a start area 23a, the position determining and control signal output means 251 outputs a signal, a start control signal, to start the elapsed timer 155. Similarly, when it is determined that the playtime monitoring and tracking means 350b is in an end area 23b, the position determining and control signal output means 251 outputs a signal, a stop control signal, to stop the elapsed timer 155. As discussed in connection with FIG. 3C, the time signal information from the elapsed timer 155 is provided to a playtime display means 185 as well as to the memory storage means 161.

Since the playtime monitoring and tracking means of this embodiment initially determines the location of the golfer/golf cart, the time of play information being accumulated in the memory storage means 161, may be stored to reflect play at various points during the game. Thus, when it is determined that the playtime monitoring and tracking means 350b is at one of the intermediate travel positions 23c, the position determining and control signal output means 251 outputs a control signal causing the elapsed time from the elapsed timer 155 to be written to the memory storage means 161. For example, the time of play when the golfer/golf cart is disposed contiguous the tee for the first hole and the time of play for completing the first hole may be stored in the memory storage means. In this way, course representatives may acquire time information that is used for purposes besides controlling slow play such as optimizing the amount of time to stagger tee off times.

In another embodiment, the information/data storage memory 255 is configured to store data representative of at least one time interval and more particularly to store data of a plurality of predetermined time intervals, a time interval for each hole or segment of the golf course. Each predetermined time interval is the amount of time, determined by course representatives, that should be needed or taken to play a given hole or segment of the, course.

As with the other embodiment, the position determining and control signal output means 251 determines the position of the monitoring and tracking means 350b on the golf course and, using position information stored in the memory 255, determines if the monitoring and tracking means 350b is at a position that corresponds to the known locations of a start area, an end area or an intermediate travel position 23a–c. In one embodiment, each intermediate travel position 23c is preferably located to correspond with the point on the golf course where play for one hole is considered to have ended and play for the next hole is considered started. In another embodiment, intermediate positions 23c, are located in conjunction with the designated start and end areas 23a–b so that each hole or course segment is defined by its own starting and ending points for purposes of time of play (i.e., each hole or segment has a unique starting and stopping point for tracking/monitoring).

When the playtime monitoring and tracking means 350b is determined to be in a start area 23a, the position determining and control signal output means 251 outputs control signals that start the elapsed timer 155 and initialize (e.g., zero) the playtime display means 185. As provided hereinabove, the elapsed timer 155 continues to run until it is determined that the playtime monitoring and tracking means 350b is located in a designated end area 23b. The position determining and control signal output means 251 also outputs a signal to the playtime display means 185 that is representative of the playtime that should be initially displayed to the golfer. It is within the scope of the present invention that wherever the discussion indicates an action is taken upon entering a start area, an end area, or an intermediate travel position, the system or means being described is configurable so the described action is taken upon leaving as well as a combination of thereof (e.g., reset when entering, and start display updating when leaving).

For a count-up display, the display means 185 is initialized to zero and for a count-down display, a signal representative of the specified predetermined time interval for the hole contiguous the start area is sent to the display means 185. For example, if it is determined that the start area contiguous the first hole is being entered, then a signal is sent to the display means 185 that is representative of the predetermined time of play interval for the first hole. Thereafter, the elapsed timer 155 output signals are used to update the time being displayed (e.g., decrement the time display for a count-down display) for either the count-up or count-down display formats. For a count-down type of display, when the time being displayed reaches zero, the updating of the time being displayed is either stopped or the display means 185 is configured so a negative time is being displayed and that time is incremented (e.g., an increasing negative time is displayed).

The position determining and control signal output means 251 using its internal clocking signals or using clocking signals from the elapsed timer 155, determines if the amount of time that has elapsed since entering or leaving the start area 23a exceeds the time of play time interval specified for the hole or course segment defined by the start area (e.g., the time interval for the first hole). When the time interval is determined to have been exceeded, a control signal(s) is outputted to actuate an auditory and/or visual alarm 263, such as the auditory or visual alarms 256,282 of the display means 244, to warn the golfer of slow play. A control signal(s) is also outputted to the display means so a prescripted message relating to slow play is displayed for the golfer.

When the monitoring and tracking means 350b is determined to have left the hole contiguous the start area 23a, representative of a golfer completing that hole, a control signal(s) is outputted by the position determining and control signal output means 251 causing the time taken to play this hole as well as the hole identifier to be written to the memory storage means 161 for later retrieval by course representatives. If the auditory/visual alarm 263 was actuated and a pre-scripted message is being displayed responsive to a determination 23*a* that the specified playtime time interval for the prior hole (i.e., the hole contiguous the start area 23*a*) was exceeded, then a control signal(s) is also outputted to turn off the alarm 263 and any slow play related pre-scripted message.

In one embodiment, each time it is determined that the playtime monitoring and tracking means 350*b* is in an intermediate travel position 23*c*, the position determining and control signal output means 251 outputs a control signal(s) to write the time taken to play the hole just completed as well as the hole identifier to the memory storage means 161, to re-initialize the display means 185, to re-initialize its internal memory concerning the time of play being tracked for each hole or course segment, and outputs a signal to the playtime display means 185 that is representative of the playtime to be initially displayed for the next hole to be played (e.g., zero for count-up displays). The display means 185 updates the time being displayed in the same fashion as discussed above for the start area 23*a*.

Similar to the discussion above concerning the start area, the position determining and control signal output means 251 determines if the amount of time that has elapsed, since starting to play the next hole, exceeds the predetermined time interval specified for that hole. Reference should be made to the discussion above regarding the start area 23*a* concerning actuation and termination of the auditory/visual alarm 263 and pre-scripted message displays. In this case, however, termination of the alarm 263 and message is caused when the playtime monitoring and tracking means 350*b* is determined to have entered the intermediate travel position 23*c* for the next hole and/or segment.

In another embodiment, as indicated above, the intermediate positions 23*c* are located in conjunction with the designated start and end areas 23*a–b* so that each hole or course segment is defined with its own unique starting and ending points for purposes of time of play. For this embodiment, each time it is determined that the playtime monitoring and tracking means 350*b* is in the intermediate travel position that defines an ending point for a hole or course segment, other than that defined by the designated end area 23*b*, then the position determining and control signal output means 251 outputs a control signal(s) to re-initialize the display means 185, to re-initialize its internal memory concerning the elapsed time being tracked for each hole or course segment, and to output a signal to the playtime display means 185 that is representative of the playtime to be initially displayed for the next hole to be played (e.g., zero for count-up displays).

If it is determined that the playtime monitoring and tracking means 350*b* is in the intermediate travel position representative of a hole's starting point, other than that defined by the designated start area 23*a*, then a control signal(s) is outputted that starts the monitoring and tracking process for the next hole. Specifically, the control signal(s) outputted cause the updating of the time being displayed by the playtime display means 185 to begin and causes the evaluation process to determine if the actual elapsed time exceeds the time of play interval specified for the next hole. Reference should also be made to the above discussions concerning actuation and termination of the auditory/visual alarm 263 and pre-scripted message displays when the time interval is exceeded.

In yet another embodiment, one or more preset time warning time intervals are specified and the position determining and control signal output means 251 evaluates the time taken to play each hole to determine if one of the specified warning time intervals is met or exceeded. These warning time intervals provide an indication to the golfer(s) that a prespecified amount of time has elapsed since starting to play a hole and/or that a prespecified amount of time remains before the specified time of play interval for completing a hole will expire. The time interval(s) are determined by the course representatives for the particular applications and different time intervals can be specified for different holes or segments. For example, the warning time interval may be defined to indicate that 15 minutes has elapsed since starting a hole or it may be defined to indicate that there is 5 or 2 minutes remaining before the play at a hole should be completed.

If it is determined that the warning time interval is exceeded, lapsed or met, then the position determining and control signal output means 251 outputs a control signal(s) preferably causing the auditory/visual alarm 263 to provide a short auditory signal (e.g., a chirping type of sound) to indicate a time interval warning. As noted above, the auditory signal should also cause the golfer to look at the playtime display means 185 to see the updated time of play being displayed.

The above actions relative to the intermediate travel positions 23*c*, and time warning signals are repeated until the playtime monitoring and tracking means 350*b*, is determined to be in an end area 23*b*. When the playtime monitoring and tracking means 350*b* enters a designated end area 23*b*, control signals are outputted causing the elapsed timer 255 to stop and, if applicable, to turn off any playtime related alarm(s) 263 and prescripted message being displayed. A control signal(s) is also outputted causing the time from the elapsed timer 255, the time taken to play the last hole or segment, and the identifier for the last hole to be written to the memory storage means 161. The information in the memory storage means 161 may be accessed later by course representatives using an information display 187 or other devices/apparatuses known in the art (e.g., microprocessor). In this way, the playtime monitoring and tracking means 350*b* can be used again and again.

While the foregoing is discussed in terms of the system using the ranging signals, the buried wire systems of FIG. 3C is configurable so a count-up or count-down display is provided; so that time to play is monitored and tracked for each hole or segment of the course; that the time taken to play each hole along with its identifier is written to the memory storage means 161; so that elapsed time warnings are given before specified time intervals expire; and/or so that alarms and/or messages are generated to indicate that the predetermined time interval for playing a hole has expired. For the count-down type of display, the predetermined time intervals for playing each hole or segment are stored and retrieved from the memory storage means 161. The playtime monitoring and tracking means 350*a* is configured so the time intervals being displayed corresponds to how the golfer intends to golf that day (i.e., the time displayed initially is for the hole that is to be played first). For example, the playtime monitoring and tracking means 350*a* is configured based on the golfer playing the front nine and then the back nine holes or the reverse.

The playtime monitoring and tracking means 350*a,b* is mounted on the golf cart 24 along with the signal receiving, processing and display means 126,226 of the present invention (FIGS. 3A,B) or it is included in a separate package for golfers who do not use golf carts. When mounted on the golf cart 24, the circuitry of the monitoring and tracking means is preferably included along with the circuitry for the signal receiving, processing and display means 126,226 and more particularly all this circuitry is integrated to eliminate duplicative components (e.g., using one receiver to receive the ranging signals to determine if the cart is located in a restricted area, a start, area an end area or one of the intermediate travel positions).

While a preferred embodiment of the invention has been described using specific terms, such description is for illustrative purposes only, and it is to be understood that changes and variations may be made without departing from the spirit or scope of the following claims.

What is claimed is:

1. A golf cart control and monitoring apparatus, comprising:

signal transmission means for transmitting a plurality of electromagnetic signals, each signal being representative of a position with respect to each of at least one restricted area of a golf course;

signal receiving and processing means for receiving and processing the electromagnetic signals from said signal transmission means and for providing output signals representative of the location of a golf cart with respect to any one of the at least one restricted area, where at least one of said signal receiving and processing means output signals is representative of a golf cart being located in any one of the at least one restricted area;

event log means, responsive to said signal receiving and processing means output signals, for generating a historical log of at least how long the golf cart was located within any one of the at least one restricted area; and wherein said signal transmission means includes at least one antenna for radiating the plurality of electromagnetic signals.

2. The golf cart control and monitoring apparatus of claim 1, wherein the historical log being generated by said event log means includes how many times the golf cart has been located in any one of the at least one restricted area.

3. The golf cart control and monitoring apparatus of claim 2, wherein said event log means includes:

an event counter, responsive to said receiver means output signals, for counting each time the golf cart has entered into any of the at least one restricted area; and time accumulation means, responsive to receiver means output signals, for determining the amount of time the golf cart has been located in any of the at least one restricted area.

4. The golf cart control and monitoring apparatus of claim 3, wherein said event log means further includes:

an event display, responsive to said event counter, that provides a visual display of the total number of restricted area entries; and a time display, responsive to said time accumulation means, that provides a visual display of the time the golf cart was located in any of the at least one restricted area.

5. The golf cart control and monitoring apparatus of claim 2, wherein said signal receiving and processing means generates a first output signal to indicate that the golf cart is approaching any one of the at least one restricted area of a golf course and generates a second output signal to indicate that the golf cart has entered any one of the at least one restricted area, and wherein said event log means begins to accumulate data upon receipt of said second output signal.

6. The golf cart control and monitoring apparatus of claim 5, wherein said event log means terminates data accumulation when said signal receiving and processing means is not receiving electromagnetic signals from said signal transmission means.

7. The golf cart control and monitoring apparatus of claim 5, wherein said signal receiving and processing means includes a signal sealing means for sealing in said second output signal until said signal receiving and processing means is not receiving electromagnetic signals from said signal transmission means.

8. The golf cart control and monitoring apparatus of claim 5, wherein said signal receiving and processing means includes determining means for determining when the golf cart is approaching any one of the at least one restricted area and when the cart is considered located in any one of the at least one restricted area and for providing said signal receiving and processing means first output signal when the cart is determined to be approaching any one of the at least one restricted area and said signal receiving and processing means second output signal when the cart is considered to be located in any one of the at least one restricted area.

9. The golf cart control and monitoring apparatus of claim 8, wherein the electromagnetic signals being generated by said signal transmission means are signal pulses being repetitively generated at a prespecified interval; and wherein said determining means further includes:

pulse counting means for counting the signal pulses from said signal transmission means, and means, responsive to said pulse counting means, for causing said signal receiving and processing means to output said second output signal after a prespecified number of signal pulses have been counted.

10. The golf cart control and monitoring apparatus of claim 8, wherein said determining means further includes clock means for determining at least elapsed time, and means responsive to said clock means, for causing said signal receiving and processing means to output said second output signal after a prespecified amount of time has elapsed after said signal receiving and processing means first output signal is initially outputted.

11. The golf cart control and monitoring apparatus of claim 1, in which said apparatus further comprises an external visual warning means, disposed on the golf cart, for generating an external visual signal, visible to golf course representatives at other locations of the golf course, to indicate the position of the golf cart with respect to any one of the at least one restricted area, wherein said external visual warning means is activated responsive to said at least one output signal representative of the golf cart being located in any one of the at least one restricted area.

12. The golf cart control and monitoring apparatus of claim 11, wherein the external visual signal being generated is terminated when said signal receiving and processing means is not receiving electromagnetic signals from said signal transmission means.

13. The golf cart control and monitoring apparatus of claim 11, wherein said external visual warning means further includes a plurality of lights.

14. The golf cart control and monitoring apparatus of claim 13, wherein said external visual warning means further includes a sequencer that controls the lighting of said plurality of lights.

15. The golf cart control and monitoring apparatus of claim 14, wherein said external visual warning means further includes a plurality of switches, controlled by said sequencer, for switchably and selectively energizing each of said plurality of lights so that said lights are sequentially and repetitively lit.

16. The golf cart control and monitoring apparatus of claim 11, wherein said signal receiving and processing means and said external visual warning means are contained in a single housing.

17. The golf cart control and monitoring apparatus of claim 1, in which said apparatus further comprises visual alarm means, responsive to said signal receiving and processing means for generating visual alarms to a cart operator that are representative of the golf cart's location with respect to any one of the at least one restricted area.

18. The golf cart control and monitoring apparatus of claim 17, wherein said visual alarm means generates a first visual alarm when the golf cart approaches any one of the at least one restricted area and a second visual alarm when the cart is considered to be in any one of the at least one restricted area, where said first and second visual alarms are distinctive from one another.

19. The golf cart control and monitoring apparatus of claim 18, wherein said signal receiving and processing means further includes determining means for determining when the golf cart is approaching any one of the at least one restricted area and when the cart is considered located in any one of the at least one restricted area and for providing said signal receiving and processing means first output signal when the cart is determined to be approaching any one of the at least one restricted area and said signal receiving and processing means second output signal when the cart is considered to be located in any one of the at least one restricted area; and wherein said first visual alarm is generated in response to said first output signal and said second visual alarm is generated in response to said second output signal.

20. The golf cart control and monitoring apparatus of claim 1, in which said apparatus further comprises auditory alarm means, responsive to said signal receiving and processing means output signals for generating auditory alarm signals to a cart operator that are representative of the golf cart's location with respect to the restricted area.

21. The golf cart control and monitoring apparatus of claim 20, wherein said auditory alarm means generates a first auditory alarm signal when the golf cart approaches a restricted area and a second auditory alarm signal when the cart is considered to be in a restricted area, where said first and second auditory alarm signals are distinctive from one another.

22. The golf cart control and monitoring apparatus of claim 21, wherein said signal receiving and processing means further includes determining means for determining when the golf cart is approaching the restricted area and when the cart is considered located in a restricted area and for providing said signal receiving and processing means first output signal when the cart is determined to be approaching the restricted area and said signal receiving and processing means second output signal when the cart is considered to be located in the restricted area; and wherein said first auditory alarm signal is generated in response to said first output signal and said second auditory alarm signal is generated in response to said second output signal.

23. The golf cart control and monitoring apparatus of claim 1, in which said apparatus further includes a display means for displaying a pre-scripted message selected from among at least one available prescripted message, the displayed message advising a golf cart operator of the cart's location with respect to any one of the at least one restricted area, wherein said display means further includes message determining means, responsive to said signal receiving and processing means output signals, for determining the pre-scripted message to be displayed.

24. The golf cart control and monitoring apparatus of claim 1, in which said apparatus further includes a solar electrical power supply means for providing electrical power from ambient light to energize said signal transmitting means.

25. The golf cart control and monitoring apparatus of claim 24, wherein said solar electrical power supply means includes a solar power cell to generate electrical power in response to incident ambient light.

26. The golf cart control and monitoring apparatus of claim 25, wherein said solar electrical power supply means further includes a power control means for regulating and controlling the electrical power from said solar electrical power supply means to said signal transmitting means.

27. The golf cart control and monitoring apparatus of claim 26, wherein said solar electrical power supply means further includes a battery and wherein said power control means regulates and controls the electrical power being supplied by said battery and said solar cell and wherein said power control means also controls charging of said battery by said solar cell.

28. The golf cart control and monitoring apparatus of claim 26, wherein said solar electrical power supply means further includes means for determining when to electrically interconnect said signal transmitting means to said electrical power supply means and switch means, responsive to said determining means, for switchably interconnecting said solar electrical power supply means and said signal transmitting means, wherein an interconnection is made at times when golf is expected to be played.

29. The golf cart control and monitoring apparatus of claim 28, wherein said determining means further includes a light detection means for detecting ambient light and wherein said switch means interconnects said power supply means and said signal transmitting means when the ambient light detected exceeds a prespecified value.

30. The golf cart control and monitoring apparatus of claim 28, wherein said solar electrical power supply means further includes a power disable switch for disconnecting said signal transmitting means from said solar electrical power supply means.

31. The golf cart control and monitoring apparatus of claim 1, wherein said signal transmission means further comprises:
one antenna for radiating said electromagnetic signals;
a transmitter for generating said electromagnetic signals being radiated by said one antenna; and
a lightning protection device, electrically interconnected to said transmitter and said one antenna, to protect said transmitter and said one antenna from the effects of lightning strikes.

32. The golf cart control and monitoring apparatus of claim 31, wherein said one antenna is disposed below grade.

33. The golf cart control and monitoring apparatus of claim 31, wherein said transmitter has a power output such that the electromagnetic signals being radiated by said one antenna at least cover the entire area bounded by said one antenna.

34. The golf cart control and monitoring apparatus of claim 33, wherein said transmitter has a power output such that the electromagnetic signals being radiated by said one antenna also cover an area that extends radially outward from said one antenna.

35. The golf cart control and monitoring apparatus of claim 1, further comprising:

a second signal transmission means for transmitting a plurality of electromagnetic signals, where one group of the signals is representative of a starting point for play and where a second group of the signals is representative of an ending point for play;

wherein said signal receiving and processing means includes a second receiver means for receiving said second transmission means electromagnetic signals, said signal receiving processing and display means providing a start signal when the first signal group is received and a stop signal when the second signal group is received; and an elapsed timer that is started in response to the start signal and is stopped in response to the stop signal, wherein said elapsed timer provides outputs of the amount of time that has elapsed since said elapsed timer received the start signal, each output being representative of time of play.

36. The golf cart control and monitoring apparatus of claim 35, further including a time of play display means, responsive to the elapsed timer outputs, for displaying the time of play.

37. The golf cart control and monitoring apparatus of claim 36, wherein there is at least one area designated on the golf course as the starting point for play and at least another area designated on the golf course as the ending point for play; wherein said second signal transmission means includes one antenna disposed at each designated starting point area and a second antenna disposed at each designated ending point area and at least two transmitters, one transmitter for each of said antennas; wherein said signal receiving and processing means further includes two receivers, where one receiver receives the signals being radiated from each starting point antenna and the other receiver receives the signals being radiated from each ending point antenna; and wherein said elapsed timer is started in response to the signals from each starting point antenna and stopped in response to the signals from each ending point antenna.

38. A device for controlling and monitoring the operation of a golf cart on a golf course, the device being responsive to ranging signals from a set of at least three remote transmitters located at known locations about the golf course to define a triangle encompassing a substantial portion of the golf course that includes restricted areas, wherein each of the transmitters transmits a repetitive ranging signal and wherein the combined ranging signals from the set of transmitters defines sets of ranging signals, the control and monitoring device comprising:

receiving means for receiving the sets of ranging signals from the transmitters; and signal processing and control means, responsive to said receiving means, for processing each received set of ranging signals to determine a location of the golf cart with respect to predetermined features of the golf course and for providing control signals, each said control signal being representative of the location of the golf cart with respect to a given predetermined feature, wherein one of said control signals is representative of a golf cart being located in any one of the restricted areas; and event log means, responsive to control signals that are representative of the location of the golf cart with respect to any one of the restricted areas, for generating a historical log of how long the golf cart has been located in any of the restricted areas.

39. The golf cart control and monitoring device of claim 38, wherein said signal processing and control means includes:

signal processing means for processing the received sets of ranging signals to provide an indication of the location of the golf cart on the golf course;

a memory for storing data indicating a location of each predetermined feature on the golf course, including an indication of the location of each restricted area;

means for accessing said memory to retrieve the indications of location of each restricted area;

determining means for processing the indication of the location for the golf cart and the indication of location for each restricted area retrieved from said memory to determine the location of the golf cart with respect to any one of the restricted areas; and means, responsive to said determining means, for providing control signals representative of the location of the golf cart, where the said one of the control signals representative of the golf cart being located in any one of the restricted areas is provided when said determining means determines that the golf cart is located within any one of the restricted areas.

40. The golf cart control and monitoring device of claim 38, wherein the historical log being generated by said event log means further includes at least how many times the golf cart was located within any of the restricted areas of the golf course.

41. The golf cart control and monitoring device of claim 40, wherein said event log means includes:

an event counter, responsive to said control signals, for counting each time the golf cart has entered into any one of the restricted areas of the golf course; and time accumulation means, responsive to said control signals, for determining at least the amount of time the golf cart has been located in each of the restricted areas.

42. The golf cart control and monitoring device of claim 41, wherein said event log means further includes:

an event display, responsive to said event counter, that provides a visual display of the number of entries into restricted areas; and a time display, responsive to said time accumulation means, that provides a visual display of at least the time the golf cart was located in each of the restricted areas.

43. The golf cart control and monitoring device of claim 40, wherein said signal processing and control means generates a first control signal to indicate that the golf cart is in a warning area about any one of the restricted areas and generates a second control signal to indicate that the golf cart has entered any one of the restricted areas, and wherein said event log means begins to accumulate data upon receipt of said second control signal.

44. The golf cart control and monitoring device of claim 43, wherein said event log means terminates data accumulation when said signal processing and control means stops sending said second control signal.

45. The golf cart control and monitoring device of claim 38, further including an external visual warning means, disposed on the golf cart, for generating a visual signal, visible to golf course representatives at other locations of the golf course, to indicate the position of the golf cart with respect to any of the restricted areas, wherein said external visual warning means is activated when said signal processing and control means determines that the golf cart is located in any one of the restricted areas.

46. The golf cart control and monitoring device of claim 45, wherein the visual signal being generated is terminated when said signal processing and control means determines that the golf cart has exited from the any one of the restricted areas.

47. The golf cart control and monitoring device of claim 45, wherein said external visual warning means includes a plurality of lights.

48. The golf cart control and monitoring device of claim 47, wherein said external visual warning means further includes a sequencer that controls the lighting of said plurality of lights.

49. The golf cart control and monitoring device of claim 48, wherein said external visual warning means further includes a plurality of switches, controlled by said sequencer, for switchably and selectively energizing each of said plurality of lights so that said lights are sequentially and repetitively lit.

50. The golf cart control and monitoring device of claim 47, wherein said signal receiving and processing means and said external visual warning means are contained in a single housing.

51. The golf cart control and monitoring device of claim 38, further including a display means for displaying a pre-scripted message selected from among at least one available prescripted message, the displayed message advising a golf cart operator of the cart's location with respect to any one of the restricted areas, wherein said display means further includes message determining means, responsive to said control signals, for determining the pre-scripted message to be displayed.

52. The golf cart control and monitoring device of claim 38, further comprising visual alarm means, responsive to control signals representative of the golf cart's location with respect to any one of the restricted areas, for generating visual alarms to a cart operator.

53. The golf cart control and monitoring device of claim 52, wherein said visual alarm means generates a first visual alarm in response to a control signal representative of the golf cart being in a warning area about any one of the restricted areas and generates a second visual alarm in response to the control signal representative of the cart being in any one of the restricted areas, where said first and second visual alarms are distinctive from one another.

54. The golf cart control and monitoring device of claim 53, wherein said signal processing and control means includes determining means for determining when the golf cart is in the warning area and when the cart is in any one of the restricted areas and for providing a first control signal when the cart is determined to be in the warning area and a second control signal when the cart is in any one of the restricted areas; and wherein said first visual alarm is generated in response to said first control signal and said second visual alarm is generated in response to said second control signal.

55. The golf cart control and monitoring device of claim 38, further comprising auditory alarm means, responsive to control signals representative of the golf cart's location with respect to any one of the restricted areas, for generating auditory alarm signals to a cart operator.

56. The golf cart control and monitoring device of claim 55, wherein said auditory alarm means generates a first auditory alarm signal in response to a control signal representative of the golf cart being in a warning area about any one of the restricted areas and a second auditory alarm signal in response to the control signal representative of the cart being in any one of the restricted areas, where said first and second auditory alarm signals are distinctive from one another.

57. The golf cart control and monitoring device of claim 56, wherein said signal processing and control means includes determining means for determining when the golf cart is in the warning area and when the cart is in any one of the restricted areas and for providing a first control signal when the cart is determined to be in the warning area and a second control signal when the cart is in any one of the restricted areas; and wherein said first auditory alarm signal is generated in response to said first control signal and said second auditory alarm signal is generated in response to said second control signal.

58. The golf cart control and monitoring device of claim 38, predetermined features of the golf course further include each area designated as a starting point for play and each area designated as an ending point for play; wherein said signal processing and control means provides a start control signal after determining the golf cart is located in each designated starting play area and a stop control signal after determining the golf cart is located in each designated ending play area; and wherein said golf cart control and monitoring device further comprises an elapsed timer that is started in response to the start control signal and is stopped in response to the stop control signal, wherein said elapsed timer provides outputs of the amount of time that has elapsed since said elapsed timer received the start control signal, each output being representative of time of play.

59. The golf cart control and monitoring device of claim 58, further comprising time of play display means, responsive to the elapsed timer outputs, for displaying the time of play.

60. A system for controlling and monitoring the operation of a golf cart on a golf course, the system comprising:

a set of at least three remote transmitters located at known locations about the golf course to define a triangle encompassing a substantial portion of the golf course that includes restricted areas, wherein each of the transmitters transmits a repetitive ranging signal and wherein the combined ranging signals from said set of transmitters defines sets of ranging signals;

receiving means for receiving the sets of ranging signals from said set of transmitters;

signal processing and control means, responsive to said receiving means, for processing each received set of ranging signals to determine the location of the golf cart with respect to predetermined features of the golf course and for providing control signals, each said control signal being representative of the location of the golf cart with respect to a given predetermined feature, wherein one of said control signals is representative of the golf cart being located in any one of the restricted areas; and event log means, responsive to control signals that are representative of the location of the golf cart with respect to any one of the restricted areas, for generating a historical log of how long the golf cart has been located in any one of the restricted areas.

61. The golf cart control and monitoring system of claim 60, wherein said signal processing and control means includes:

signal processing means for processing the received sets of ranging signals to provide an indication of the location of the golf cart on the golf course;

a memory for storing data indicating the location of each predetermined feature on the golf course including an indication of the location of each restricted area;

means for accessing said memory to retrieve the indications of location of each restricted area;

determining means for processing the indication of the location for the golf cart and the indication of location for each restricted area retrieved from said memory to determine the location of the golf cart with respect to any one of the restricted areas; and means, responsive to said determining means, for providing control signals representative of the location of the golf cart, where the said one of the control signals representative of the golf cart being located in any one of the restricted areas is provided when said determining means determines that the golf cart is located within any one of the restricted areas.

62. The golf cart control and monitoring system of claim 60, wherein the historical log being generated by said event log means further includes at least how many times the golf cart was located within any one of the restricted areas of the golf course.

63. The golf cart control and monitoring system of claim 62, wherein said event log means includes:

an event counter, responsive to said control signals, for counting each time the golf cart has entered into any one of the restricted areas of the golf course; and time accumulation means, responsive to said control signals, for determining at least the amount of time the golf cart has been located in each of the restricted areas.

64. The golf cart control and monitoring system of claim 63, in which said event log means further includes:

an event display, responsive to said event counter, that provides a visual display of the number of restricted area entries; and a time display, responsive to said time accumulation means, that provides a visual display of at least the time the golf cart was located in each of the restricted areas.

65. The golf cart control and monitoring system of claim 62, wherein said signal processing and control means generates a first control signal to indicate that the golf cart is in a warning area about any one of the restricted areas and generates a second control signal to indicate that the golf cart is in any one of the restricted areas, and wherein said event log means begins to accumulate data upon receipt of said second control signal.

66. The golf cart control and monitoring system of claim 65, wherein said event log means terminates data accumulation when said signal processing and control means stops sending said second control signal.

67. The golf cart control and monitoring system of claim 60, in which said system further includes an external visual warning means, disposed on the golf cart, for generating a visual signal, visible to golf course representatives at other locations of the golf course, to indicate the position of the golf cart with respect to any of the restricted areas, wherein said external visual warning means is activated when said signal processing and control means determines that the golf cart is located in any one of the restricted areas.

68. The golf cart control and monitoring system of claim 67, wherein the visual signal being generated is terminated when said signal processing and control means determines that the golf cart has exited from the any one of the restricted areas.

69. The golf cart control and monitoring system of claim 67, wherein said external visual warning means includes a plurality of lights.

70. The golf cart control and monitoring system of claim 69, wherein said external visual warning means further includes a sequencer that controls the lighting of said plurality of lights.

71. The golf cart control and monitoring system of claim 70, wherein said external visual warning means further includes a plurality of switches, controlled by said sequencer, for switchably and selectively energizing each of said plurality of lights so that said lights are sequentially and repetitively lit.

72. The golf cart control and monitoring system of claim 67, wherein said signal receiving and processing means and said external visual warning means are contained in a single housing.

73. The golf cart control and monitoring system of claim 60, in which said system further includes a display means for displaying a pre-scripted message selected from among at least one available prescripted message, the displayed message advising a golf cart operator of the cart's location with respect to any one of the restricted areas, wherein said display means further includes message determining means, responsive to said control signals, for determining the pre-scripted message to be displayed.

74. The golf cart control and monitoring system of claim 60, in which said system further comprises visual alarm means, responsive to control signals representative of the golf cart's location with respect to any one of the restricted areas, for generating visual alarms to a cart operator.

75. The golf cart control and monitoring system of claim 74, wherein said visual alarm means generates a first visual alarm in response to a control signal representative of the golf cart being in a warning area about any one of the restricted areas and generates a second visual alarm in response to the control signal representative of the cart being in any one of the restricted areas, where said first and second visual alarms are distinctive from one another.

76. The golf cart control and monitoring system of claim 75, wherein said signal processing and control means includes determining means for determining when the golf cart is in the warning area and when the cart is in any one of the restricted areas and for providing a first control signal when the cart is determined to be in the warning area and a second control signal when the cart is in any one of the restricted areas; and wherein said first visual alarm is generated in response to said first control signal and said second visual alarm is generated in response to said second control signal.

77. The golf cart control and monitoring system of claim 60, in which said system further comprises auditory alarm means, responsive to control signals representative of the golf cart's location with respect to any one of the restricted areas, for generating auditory alarm signals to a cart operator.

78. The golf cart control and monitoring system of claim 77, wherein said auditory alarm means generates a first auditory alarm signal in response to a control signal representative of the golf cart being in a warning area about any one of the restricted areas and a second auditory alarm signal in response to the control signal representative of the cart being in any one of the restricted areas, where said first and second auditory alarm signals are distinctive from one another.

79. The golf cart control and monitoring system of claim 78, wherein said signal processing and control means includes determining means for determining when the golf cart is in the warning area and when the cart is in any one of the restricted areas; wherein said signal processing and control means provides the first control signal when the cart is determined to be in the warning area and the second control signal when the cart is in any one of the restricted areas; and wherein said first auditory alarm signal is generated in response to said first control signal and said second auditory alarm signal is generated in response to said second control signal.

80. The golf cart control and monitoring system of claim 60, wherein the predetermined features of the golf course further include each area designated as a starting point for play and each area designated as an ending point for play; wherein said signal processing and control means provides a start control signal after determining the golf cart is located in each designated starting play area and a stop control signal after determining the golf cart is located in each designated ending play area; and wherein said golf cart controlling and monitoring system further comprises an elapsed timer that is started in response to the start control signal and is stopped in response to the stop control signal, wherein said elapsed timer provides outputs of the amount of time that has elapsed since said elapsed timer received the start control signal, each output being representative of time of play.

81. The golf cart control and monitoring system of claim 80 further comprising time of play display means, responsive to the elapsed timer outputs, for displaying the time of play.

82. A system for controlling and monitoring the operation of a golf cart on a golf course, the system comprising:

a set of at least three remote transmitters located at known locations about the golf course to define a triangle encompassing a substantial portion of the golf course that includes each area on the golf course designated as a starting point for play and each area on the golf course designated as an ending point for play, wherein each of the transmitters transmits a repetitive ranging signal and wherein the combined ranging signals from said set of transmitters defines sets of ranging signals;

receiving means for receiving the sets of ranging signals from said set of transmitters;

signal processing and control means, responsive to said receiving means, for processing each received set of ranging signals to determine the location of the golf cart with respect to predetermined features of the golf course and for providing control signals, each said control signal being representative of the location of the golf cart with respect to a given predetermined feature, wherein one of said control signals, a start control signal, is representative of the golf cart being located in each designated starting point area and another of said control signals, a stop control signal, is representative of the golf cart being located in each designated ending point area; and an elapsed timer that is started in response to the start control signal and is stopped in response to the stop control signal, wherein said elapsed timer provides outputs of the amount of time that has elapsed since said elapsed timer received the start control signal, each output being representative of time of play.

83. The golf cart control and monitoring system of claim 82, wherein said signal processing and control means includes:

signal processing means for processing the received sets of ranging signals to provide an indication of the location of the golf cart on the golf course;

a memory for storing data indicating the location of each predetermined feature on the golf course including an indication of the location of each starting point area and each ending point area;

means for accessing said memory to retrieve the indications of location of each predetermined feature;

determining means for processing the indication of the location for the golf cart and the indication of location for each predetermined feature retrieved from said memory to determine the location of the golf cart with respect to at least one of each starting point area and each ending point area; and means, responsive to said determining means, for providing control signals representative of the location of the golf cart, where the start control signal is provided when said determining means determines that the golf cart is located in each designated starting point area and the stop control signal is provided when said determining means determines that the golf cart is located in each designated ending point area.

84. The golf cart control and monitoring system of claim 82, further comprising time of play display means, responsive to the elapsed timer outputs, for displaying the time of play.

85. The golf cart control and monitoring system of claim 82, further comprising memory storage means for storing the elapsed timer outputs representative of the time of play.

86. The golf cart control and monitoring system of claim 85, further comprising means for retrieving at least the time of play for a game from said memory storage means and displaying the retrieved time of play to course representatives.

87. The golf cart control and monitoring system of claim 82, wherein the predetermined features further includes restricted areas of the golf course; wherein said signal processing and control means provides another control signal after determining the golf cart is located in any one of the restricted areas and in which said system further includes an event log means, disposed on the golf cart and being responsive to the control signal representative of the location of the golf cart with respect to any one of the restricted areas, for generating a historical log of how many times and for how long the golf cart has been located within any one of the restricted areas of a golf course, wherein said event log means includes:

(i) means, responsive to the signal processing and control means control signals, for counting each time the golf cart has entered into any one of the restricted areas and for providing a visual display to a golf cart operator of the total number of restricted area entries; and (ii) time means, responsive to the signal processing and control means control signals, for determining the cumulative amount of time the golf cart has been located in any one of the restricted areas and for providing a visual display to the golf cart operator of the cumulative time.

88. The golf cart control and monitoring system of claim 87, wherein said signal processing and control means generates a first control signal to indicate that the golf cart is approaching any one of the restricted areas and generates a second control signal to indicate that the golf cart has entered any one of the restricted areas; wherein said event log means begins to accumulate data upon receipt of the second control signal; and wherein said event log means terminates data accumulation upon receipt of the first control signal.

89. The golf cart control and monitoring system of claim 87, further including a display means, disposed on the golf cart, for displaying at least one pre-scripted message selected from among at least one available prescripted message, the displayed message advising a golf cart operator of the cart's location with respect to any one of the restricted areas, wherein said display means further includes message determining means, responsive to said receiver means output signals, for determining the pre-scripted message to be displayed.

90. A golf cart control and monitoring apparatus, comprising:

signal transmission means for transmitting a plurality of electromagnetic signals, where one group of the signals is representative of a starting point for play and where a second group of the signals is representative of an ending point for play;

signal receiving processing and display means for receiving, and processing the electromagnetic signals from said signal transmission means and for providing output signals representative of the location of a golf cart, wherein said signal receiving processing and display means provides a start signal when the first signal group is received and a stop signal when the second signal group is received; and an elapsed timer that is started in response to the start signal and is stopped in response to the stop signal, wherein said elapsed timer provides outputs of the amount of time that has elapsed since said elapsed timer received the start signal, each output being representative of time of play.

91. The golf cart control and monitoring apparatus of claim 90, wherein said signal receiving processing and display means includes time of play display means, responsive to the elapsed timer outputs, for displaying the time of play.

92. The golf cart control and monitoring apparatus of claim 91, wherein there is at least one area designated on the golf course as the starting point and at least another area designated on the golf course as the ending point; wherein said signal transmission means includes one antenna disposed at each of the at least one starting point area and a second antenna disposed at each of the at least one ending point area and a transmitter for each of said antennas; wherein said signal receiving processing and display means further includes two receivers, where one receiver receives the signals being radiated from said antenna at each of the at least one starting point area and the other receiver receives the signals being radiated from said antenna at each of the at least one ending point area; and wherein said elapsed timer is started in response to the signals from each starting point antenna and stopped in response to the signals from each ending point antenna.

93. The golf cart control and monitoring apparatus of claim 92, wherein said transmitter for the starting point area antenna transmits at a different frequency than said transmitter for the ending point area antenna and wherein said receivers are each configured to receive the electromagnetic signals at the frequency being used for transmission.

94. The golf cart control and monitoring apparatus of claim 90, further comprising memory storage means for storing the elapsed timer outputs from the elapsed timer representative of the time of play.

95. The golf cart control and monitoring apparatus of claim 94, further comprising means for retrieving at least the time of play for a game from said memory storage means and displaying the retrieved time of play to course representatives.

96. The golf cart control and monitoring apparatus of claim 90, further comprising:

second signal transmission means for transmitting a plurality of electromagnetic signals, each signal being representative of a position with respect to each of at least one restricted area of a golf course, wherein said second signal transmission means includes at least one antenna for radiating the plurality of electromagnetic signals;

wherein said signal receiving processing and display means includes a means for receiving and processing the electromagnetic signals from said second signal transmission means and for providing output signals representative of the location of a golf cart with respect to any one of the at least one restricted area, where at least one of said signal receiving and processing means output signals is representative of a golf cart being located in any one of the at least one restricted area; and event log means, responsive to the signal receiving and processing means output signals representative of the location of the cart with respect to any one of the at least one restricted area, for generating a historical log of how long and how many times the golf cart was located within any of the at least one restricted area of the golf course.

97. The golf cart control and monitoring apparatus of claim 96, wherein said event log means includes:

means, responsive to the signal receiving and processing means output signals representative of the cart being in any one of the at least one restricted area, for counting each time the golf cart has entered into any one of the at least one restricted area and for providing a visual display to a golf cart operator of the total number of restricted area entries; and time means, responsive to the signal receiving and processing means output signals representative of the location of the cart with respect to any one of the at least one restricted area, for determining the cumulative amount of time the golf cart has been located in any one of the at least one restricted area and for providing a visual display to the golf cart operator of the cumulative time.

98. The golf cart control and monitoring apparatus of claim 97, wherein said signal receiving processing and display means generates a first control signal to indicate that the golf cart is approaching any one of the at least one restricted area and generates a second control signal to indicate that the golf cart has entered any one of the at least one restricted area; wherein said event log means begins to accumulate data upon receipt of the second control signal; and wherein said event log means terminates data accumulation when said signal receiving and processing means is not receiving electromagnetic signals from said second signal transmission means.

99. The golf cart control and monitoring apparatus of claim 96, wherein said signal receiving processing and display means further includes a display means, disposed on the golf cart, for displaying at least one pre-scripted message selected from among at least one available prescripted message, the displayed message advising a golf cart operator of the cart's location with respect to any of the at least one restricted area, wherein said display means further includes message determining means, responsive to the signal receiving and processing means output signals representative of the location of the cart with respect to any one of the at least one restricted area, for determining the pre-scripted message to be displayed.

100. A golfing control and monitoring apparatus, comprising:

hole determining means for autonomously determining a hole to be played;

time interval means for storing at least one predetermined time interval representative of the time of play for at least one hole on a golf course and for selecting a time interval, from among the at least one stored predetermined time intervals, for the hole to be played as is determined by said hole determining means; and an elapsed timer, responsive to said hole determining and time interval means, said elapsed timer outputting signals representative of time that has elapsed for the hole being played.

101. The golfing control and monitoring apparatus of claim 100, further comprising display means, responsive to said elapsed timer and said time interval means, for displaying time of play for each hole.

102. The golfing control and monitoring apparatus of claim 101, wherein said display means includes a count-down clock display, wherein said count-down clock display initially displays the selected time interval, and wherein the time of play being displayed by said count-down display is decremented responsive to clocking signals from said elapsed timer.

103. The golfing-control and monitoring apparatus of claim 102, further comprising time means for determining when time that has elapsed for the hole being played exceeds the selected time interval.

104. The golfing control and monitoring apparatus of claim 103, wherein said display means further includes a message display for displaying a pre-scripted message when said time means determines that the selected time interval is exceeded.

105. The golfing control and monitoring apparatus of claim 103, further comprising a time alarm, said time alarm providing an alarm signal to a golfer when said time means determines that the selected time interval is exceeded.

106. The golfing control and monitoring apparatus of claim 105, wherein said display means includes a count-up clock display and wherein the time of play being displayed by said count-up clock display for a given hole is incremented responsive to clocking signals from said elapsed timer.

107. The golfing control and monitoring apparatus of claim 106, further comprising time means for determining when time that has elapsed for the hole being played exceeds the selected time interval.

108. The golfing control and monitoring apparatus of claim 107, wherein said display means further includes a message display for displaying a pre-scripted message when said time means determines that the selected time interval is exceeded.

109. The golfing control and monitoring apparatus of claim 107, further comprising a time alarm, said time alarm providing an alarm signal to a golfer when said time means determines that the selected time interval is exceeded.

110. The golfing control and monitoring apparatus of claim 104, further comprising a memory storage means for storing information and data, wherein time taken to play a given hole and an identifier for the given hole is stored in said memory storage means.

111. The golfing control and monitoring apparatus of claim 110, further comprising means for retrieving at least the time interval and hole identifier data stored in said memory storage means and for displaying retrieved information to course representatives.

112. The golfing control and monitoring apparatus of claim 100, further comprising:

time warning means for determining when the time that has elapsed for the hole being played meets any of at least one specified warning time interval; and warning alarm means, responsive to said time warning means, for generating a warning signal to a golfer to indicate that one of the said at least one specified warning time intervals has been met.

113. The golfing control and monitoring apparatus of claim 112, wherein said warning alarm means includes an alarm that generates an auditory signal.

114. The golfing control and monitoring apparatus of claim 100, wherein said hole determining means includes:

a set of at least three remote transmitters located at known locations about the golf course to define a triangle encompassing a substantial portion of the golf course that includes predetermined features such as each area on the golf course designated as a starting point for play, each area on the golf course designated as an ending point for play and each area on the golf course designated as an intermediate play position, wherein each of the transmitters transmits a repetitive ranging signal and wherein the combined ranging signals from said set of transmitters defines sets of ranging signals;

receiving means for receiving the sets of ranging signals from said set of transmitters; and signal processing and control means, responsive to said receiving means, for processing each received set of ranging signals to determine the location of the golf cart with respect to the predetermined features of the golf course and for providing control signals, each said control signal being representative of the location of the golf cart with respect to a given predetermined feature, wherein a start control signal is provided when the golf cart is determined to be located in each designated starting point area, wherein a stop control signal is provided when the golf cart is determined to be located in each designated ending point area, and wherein an intermediate play position control signal is provided when the golf cart is determined to be located at each designated intermediate play positions on the golf course.

115. The golfing control and monitoring apparatus of claim 114, wherein said time interval means selects the time interval for the hole to be played responsive to said start, stop, and intermediate play position control signals.

116. The golfing control and monitoring apparatus of claim 114, wherein each designated starting point area, each designated ending point area, and each designated intermediate play position are located so that each hole of the golf course is defined by a unique starting and ending point.

117. The golfing control and monitoring apparatus of claim 114, wherein said signal processing and control means includes:

signal processing means for processing the received sets of ranging signals to provide an indication of the location of the golf cart on the golf course;

a memory for storing data indicating the location of each predetermined feature on the golf course including an indication of the location of each starting point area, each ending point area and each intermediate play position;

means for accessing said memory to retrieve the indications of location of each predetermined feature;

determining means for processing the indication of the location for the golf cart and the indication of location for each predetermined feature retrieved from said memory to determine the location of the golf cart with respect to the predetermined feature; and means, responsive to said determining means, for providing control signals representative of the location of the golf cart, where the start control signal is provided when said determining means determines that the golf cart is located in the designated starting point area and the stop control signal is provided when said determining means determines that the golf cart is located in the designated ending point area.

118. The golfing control and monitoring apparatus of claim 121, wherein the predetermined features of the golf course further include restricted areas; wherein said memory stores an indication of the location of each restricted area of the golf course, wherein one of the control signals of said signal processing and control means is representative of the golf cart being located in any one of the restricted areas and in which said system further includes an event log means, disposed on the golf cart and being responsive to the control signals that are representative of the location of the golf cart with respect to any one of the restricted areas, for generating a historical log of how many times and for how long the golf cart has been located within any one of the restricted areas of a golf course, wherein said event log means includes:

(i) means, responsive to the signal processing and control means control signals, for counting each time the golf cart has entered into any one of the restricted areas and for providing a visual display to a golf cart operator of the total number of restricted area entries; and (ii) time means, responsive to the signal processing and control means control signals, for determining the cumulative amount of time the golf cart has been located in any one of the restricted areas and for providing a visual display to the golf cart operator of the cumulative time.

119. The golfing control and monitoring apparatus of claim 118, wherein said signal processing and control means generates a first control signal to indicate that the golf cart is approaching any one of the restricted areas and generates a second control signal to indicate that the golf cart has entered any one of the restricted areas; wherein said event log means begins to accumulate data upon receipt of the second control signal; and wherein said event log means terminates data accumulation upon receipt of the first control signal.

120. The golfing control and monitoring apparatus of claim 119, in which said apparatus further includes a display means, disposed on the golf cart, for displaying at least one pre-scripted message selected from among at least one available prescripted message, the displayed message advising a golf cart operator of the cart's location with respect to any one of the restricted areas, wherein said display means further includes message determining means, responsive to said receiver means output signals, for determining the pre-scripted message to be displayed.

121. The golfing control and monitoring apparatus of claim 100, wherein said hole determining means includes:

signal transmission means for transmitting a plurality of electromagnetic signals, where one group of the signals is representative of a starting point for play, where a second group of the signals is representative of an ending point for play, and where a third group of signals is representative of an intermediate play position; and signal receiving processing and display means for receiving and processing the electromagnetic signals from said signal transmission means and for providing output signals representative of the location of a golf cart, wherein said signal receiving processing and display means provides a start signal when the first signal group is received, provides a stop signal when the second signal group is received, and provides an intermediate play position signal when the third signal group is received.

122. The golfing control and monitoring apparatus of claim 121, wherein said time interval means selects the time interval for each hole to be played responsive to said start, stop, and intermediate play position signals.

123. The golfing control and monitoring apparatus of claim 121, wherein there is at least one area designated on the golf course as a starting point, at least another area designated on the golf course as an ending point and a plurality of areas designated as intermediate play positions; and wherein said signal transmission means includes one antenna disposed at each of the at least one starting point area, a second antenna disposed at each of the at least one ending point area, one antenna at each designated intermediate play position, and a transmitter for each of said antennas; wherein said signal receiving processing and display means includes at least three receivers, where one receiver receives the signals being radiated from said antenna at each of the at least one starting point area, a second receiver receives the signals being radiated from said antenna at each of the at least one ending point area and where a third receiver receives the signals radiating from each intermediate play position antenna.

124. The golfing control and monitoring apparatus of claim 123, wherein each transmitter transmits at a different frequency and wherein each of said receivers is configured to receive the electromagnetic signals at the frequency for the associated transmitter.

125. The golfing control and monitoring apparatus of claim 121, further comprising:

second signal transmission means for transmitting a plurality of electromagnetic signals, each signal being representative of a position with respect to each of at least one restricted area of the golf course, wherein said second signal transmission means includes at least one antenna disposed proximate each of the at least one restricted area for radiating the plurality of electromagnetic signals;

wherein said signal receiving processing and display means includes a means for receiving and processing the electromagnetic signals from said second signal transmission means and for providing output signals representative of the location of a golf cart with respect to any one of the at least one restricted area, where at least one of said signal receiving and processing means output signals is representative of a golf cart being located in any one of the at least one restricted area; and event log means, responsive to the signal receiving and processing means output signals representative of the location of the cart with respect to any one of the at least one restricted area, for generating a historical log of how long and how many times the golf cart was located within any one of the at least one restricted area.

126. The golfing control and monitoring apparatus of claim 125, wherein said event log means includes:

means, responsive to the signal receiving and processing means output signals representative of the cart being in any one of the at least one restricted area, for counting each time the golf cart has entered into any one of the at least one restricted area and for providing a visual display to a golf cart operator of the total number of restricted area entries; and time means, responsive to the signal receiving and processing means output signals representative of the location of the cart with respect to any one of the at least one restricted area, for determining the cumulative amount of time the golf cart has been located in any one of the at least one restricted area and for providing a visual display to the golf cart operator of the cumulative time.

127. The golfing control and monitoring apparatus of claim 121, wherein said signal receiving processing and display means includes a display means, disposed on the golf cart, for displaying at least one pre-scripted message selected from among at least one available prescripted message, the displayed message advising a golf cart operator of the cart's location with respect to any one of at least one restricted area, wherein said display means further includes message determining means, responsive to the signal receiving and processing means output signals, for determining the prescripted message to be displayed.

* * * * *